(12) United States Patent
Tanaka

(10) Patent No.: US 6,721,879 B1
(45) Date of Patent: Apr. 13, 2004

(54) MEDIUM CONTAINING COMPUTER PERIPHERAL DEVICE MAINTENANCE GUIDE PROGRAM, COMPUTER PERIPHERAL DEVICE MAINTENANCE GUIDE DEVICE, AND COMPUTER PERIPHERAL DEVICE MAINTENANCE GUIDE METHOD

(75) Inventor: Shinji Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/445,076

(22) PCT Filed: Apr. 14, 1999

(86) PCT No.: PCT/JP99/01990

§ 371 (c)(1),
(2), (4) Date: Mar. 9, 2000

(30) Foreign Application Priority Data

Apr. 17, 1998 (JP) .............................. 10-107906

(51) Int. Cl.⁷ .................... G06F 15/177; G06F 1/24
(52) U.S. Cl. ............................. 713/1; 713/2; 713/100
(58) Field of Search ............................ 713/1, 2, 100

(56) References Cited

U.S. PATENT DOCUMENTS

| 4,682,158 A | * | 7/1987 | Ito et al. ................. 340/679 |
| 5,935,228 A | * | 8/1999 | Shinomura ............... 709/321 |
| 6,239,800 B1 | * | 5/2001 | Mayhew et al. ........... 345/764 |

FOREIGN PATENT DOCUMENTS

| JP | 6-48000 | 2/1994 | ............ B41J/29/46 |
| JP | 08-123711 A | 5/1996 | |
| JP | 08/147063 A | 6/1996 | |
| JP | 9-80987 | 3/1997 | ............ G03G/21/00 |
| JP | 9-97235 | 4/1997 | ............ G06F/15/00 |
| JP | 10-021030 A | 1/1998 | |
| JP | 10-119394 | 5/1998 | ............ B41J/29/46 |

OTHER PUBLICATIONS

Hewlett Packard Office in Color for OfficeJet Pro 1170C Series, Jan. 1, 1997, Hewlett Packard, pp. 49.*

Japanese Patent Office Communication dated Sep. 25, 2002.

* cited by examiner

Primary Examiner—Thomas M. Heckler
Assistant Examiner—Suresh K Suryawanshi
(74) Attorney, Agent, or Firm—Sughrue Mion, PLLC

(57) ABSTRACT

In a case where maintenance operations are sequentially performed while the status of a computer peripheral device is determined, the status of the computer peripheral device may not be clearly determined, and it may be difficult for a user to perform the next operation. In a setup operation of a printer 1050, the status of the printer 1050 such as existence/absence of ink cartridge or ink charging operation is detected on the side of computer 1010 via a printer driver 1073. On the other hand, a setup guide program 1075 determines the progress of the setup operation from the status change of the printer 1050, and sequentially displays images showing operation procedures in correspondence with the progress. Accordingly, it is not necessary for the user to perform the setup operation while determining the status of the printer 1050, and the user can smoothly perform the setup operation.

5 Claims, 30 Drawing Sheets

MEDIUM CONTAINING COMPUTER PERIPHERAL DEVICE MAINTENANCE GUIDE PROGRAM, COMPUTER PERIPHERAL DEVICE MAINTENANCE GUIDE DEVICE, AND COMPUTER PERIPHERAL DEVICE MAINTENANCE GUIDE METHOD

TECHNICAL FIELD

The present invention relates to a medium containing a computer peripheral device maintenance guide program for displaying guidance information indicative of a procedure of maintenance operation of a computer peripheral device in a computer to which the computer peripheral device is connected, a computer peripheral device maintenance guide device, and a computer peripheral device maintenance guide method.

BACKGROUND ART

To use a computer peripheral device such as a printer, various install operations must be performed. For example, in case of a printer, connection of an interface cable, attachment of ink or toner cartridge, installation of printer driver, and the like, are performed as install operations. Among these operations, the printer driver or the like can be automatically installed by using a predetermined install program, however, the other operations such as attachment of cartridge must be manually performed in accordance with predetermined procedures.

Conventionally, such install operations are described in a book-style manual came with the printer. A user performs the operations by referring to the manual arbitrarily. However, with the recent widespread use of computers, general users without basic knowledge perform these install operations. For this reason, to provide more practical install operation procedures, a recording medium such as a CD-ROM for displaying install operation procedures with moving pictures and/or photographs is provided with the printer. The recording medium contains a setup guide program. When the setup guide program is executed on the computer, install operation procedures with moving pictures and/or photographs are displayed as described above. The user conducts the install operations while watching the display images.

DISCLOSURE OF THE INVENTION

The above-described conventional art has the following problem.

It is apparent that the user can easily understand the install operations if install operation procedures are displayed with moving pictures and/or photographs. However, in a case where the user must sequentially conduct plural steps of install operation while judging the status of a computer peripheral device, it was difficult for the user to determine whether or not he/she can perform the next operation step. For example, in a case where predetermined initialization processing must be performed after a computer peripheral device has been powered and the next operation step must be performed after the completion of the initialization processing, the user does not know in what status he/she can determine the completion of the initialization. In this case, the user cannot determine whether or not the next operation step can be performed.

The present invention has been made in consideration of the above problem, and has its object to provide a medium containing a computer peripheral device maintenance guide program for displaying user-friendly guidance information for smooth maintenance operation in case of maintenance operation while judging the status of the computer peripheral device, a computer peripheral device maintenance device, and a computer peripheral device maintenance guide method for the computer peripheral device.

To attain the foregoing object, the present invention according to claim 1 provides a medium containing a computer-executable computer peripheral device maintenance guide program to display guidance information indicative of a procedure of a maintenance operation of a computer peripheral device, in a computer to which the computer peripheral device is connected, the program comprising: a status change detection step of detecting a status change of the computer peripheral device; a progress acquisition step of acquiring progress of the maintenance operation, based on the status change of the computer peripheral device detected at the status change detection step; and a guidance display step of obtaining corresponding guidance information from a series of guidance information, provided corresponding to the progress of the maintenance operation in advance, based on the progress acquired at the progress acquisition step, and producing a screen display of the guidance information on the computer.

In the present invention according to claim 1 having the above construction, when a computer peripheral device maintenance operation is performed, the maintenance guide program is executed on a computer to which the computer peripheral device is connected, and a user sequentially performs a series of maintenance operations in accordance with displayed guidance information. In the execution of the maintenance operation, if the status of the computer peripheral device changes, the maintenance guide program detects the status change at the status change detection step. Then at the progress acquisition step, the program obtains the progress of the maintenance operation based on the actually detected status change. At the guidance display step, the program obtains guidance information from a series of guidance information, previously set in correspondence to the progress of the maintenance operation, based on the progress, and then displays the guidance information.

According to the conventional art, the user performs maintenance operations while judging the status of the computer peripheral device. On the other hand, according to the present invention, guidance information corresponding to the progress of the maintenance operation is displayed, therefore, the user simply performs the maintenance operations sequentially in accordance with displayed images. For example, in a case where the computer peripheral device starts initial operation after the power of the device is turned on, and the maintenance operation is started after the completion of initial operation, the completion of initial operation can be detected and guidance information for the maintenance operation to be performed thereafter can be displayed by the maintenance guide program. In this case, it is not necessary for the user to determine whether or not the initial operation of the computer peripheral device has been completed. The user can simply perform the maintenance operation in accordance with the displayed guidance information. This is helpful for the user.

The maintenance operation here means an operation manually performed by the user. The maintenance operation includes various operations such as an install operation into the computer, maintenance work like exchange of part, and an operation to remove an error. For example, in a case where the present invention is applied to a printer as a computer peripheral device, guidance on printer install operation may be displayed, or guidance on operation procedure for removal of error such as paper jam may be displayed.

The medium in which the maintenance guide program is recorded may be a magnetic recording medium or a magneto-optic recording medium, or further, may be any recording medium to be developed in the future. Further, duplicates including primary and secondary duplicates can be considered to be equivalent to the above recording medium. Further, the present invention can be applied to a case where the maintenance guide program is supplied via a communication line. Further, the present invention can be applied to a case where the maintenance guide program is written into a semiconductor chip.

Further, the idea of the invention does not change at all when the invention is realized by partially software and partially hardware. Further, the present invention can be applied to a case where a part of the invention is stored in a recording medium and it is arbitrarily read in accordance with necessity.

In this manner, to realize the present invention by software, hardware and an operating system may be utilized, or the present invention may be realized separately from the hardware and operating system. For example, the processing to detect the status change may be performed by reading a predetermined function in the operating system, or may be performed by inputting such function from the hardware. Even in a case where the invention may be realized via the operating system, it can be understood that in the progress of recording the program into the medium to be delivered to users, the present invention can be implemented only by the program.

Further, in a case where the present invention is implemented by software, the invention is realized as a medium containing a program, further, the present invention is realized as the program itself. Accordingly, the program itself is included in the present invention.

In a case where the guidance information is displayed, the concrete guidance information may be displayed in various forms such as a message explaining the procedure of the maintenance operation or the message with drawings and photographs. Using drawings and photographs can realize more practical maintenance operation guidance. For this reason, the present invention according to claim 2 provides the medium containing the computer-executable computer peripheral device maintenance guide program according to claim 1, wherein guidance information as a moving picture is displayed.

In the present invention according to claim 2 having the above construction, the guidance information on the maintenance operation is displayed as a moving picture. Note that the moving picture may utilize a video image or time-sequential display of plural still images. The concrete format of the moving picture is not particularly limited. Further, if the computer has an audio output mechanism, audio guidance may be outputted in correspondence with the display of the moving picture of the guidance information.

The content of the guidance information to be displayed is not limited to any particular content as long as it practically relates to the maintenance operation. As an example, the present invention according to claim 3 provides the medium containing the computer-executable computer peripheral device maintenance guide program according to any one of claim 1 and 2, wherein at the guidance display step, guidance information relating to the progress of the maintenance operation is displayed.

In the present invention according to claim 3 having the above construction, the guidance information relating to the progress of the maintenance operation is displayed, which helps the user. That is, as the guidance information is displayed in correspondence with the progress of the maintenance work, the user who does not judge by himself/herself the status of the computer peripheral device, but the user can easily perform the maintenance operation based on the displayed information as a guideline of judgment. More particularly, a necessary period for the maintenance operation may be displayed, or the progress of the maintenance operation may be displayed in the form of a status bar.

When the maintenance operation of the computer peripheral device has been completed, it may be checked whether or not the computer peripheral device normally operates. Accordingly, the present invention according to claim 4 provides the medium containing the computer-executable computer peripheral device maintenance guide program according to any one of claims 1 to 3, wherein at the guidance display step, guidance information relating to a procedure of operation check on the computer peripheral device is displayed.

That is, considering the operation check as a part of the maintenance operation, guidance information relating to the checking operation procedure is displayed. Further, the operation check guidance information may has a wide variety of contents; for example, the guidance information may indicate an operation check procedure, or may indicate that the operation check is being performed.

If it is determined as a result of operation check of the computer peripheral device in this manner that the device has an error in its operation, the factor of the error must be removed. For this purpose, the present invention according to claim 5 provides the medium containing the computer-executable computer peripheral device maintenance guide program according to claim 4, wherein at the guidance display step, guidance information to remove an error in an operation of the computer peripheral device in the operation check is displayed.

In the present invention according to claim 5 having the above construction, if it is determined as a result of operation check of the computer peripheral device that there is an error in the operation, guidance information to remove the error is displayed. The guidance information may be a method to actually handle the error, or if the computer peripheral device is self-recoverable from an error, may indicate that self recovery is being performed.

In this manner, the method for displaying guidance information indicative of the procedure of maintenance operation of the computer peripheral device, comprising determining the progress of the maintenance operation based on the change of status of the computer peripheral device, and displaying the guidance information in correspondence with the progress, can be realized in a computer having a material substance. In this meaning, it can be easily understood that the present invention is applicable to a device having a material substance including a computer. Accordingly, the present invention according to claim 6 provides a computer peripheral device maintenance guide device to display guidance information indicative of a procedure of a maintenance operation of a computer peripheral device, in a computer to which the computer peripheral device is connected, the device comprising: a status change detection unit for detecting a status change of the computer peripheral device; a progress acquisition unit for acquiring progress of the maintenance operation, based on the status change of the computer peripheral device detected by the status change detection unit; and a guidance display unit for obtaining corresponding guidance information from a series of guidance information, provided corresponding to the progress of the maintenance operation in advance, based on the progress acquired by the progress acquisition unit, and producing a screen display of the guidance information on the computer.

That is, the present invention can be realized as a device having a material substance controlled by a computer. Such computer peripheral device maintenance guide device may be implemented as a single device, or may be incorporated into another device and implemented with another method. Thus, the idea of the invention is not limited to the computer peripheral device maintenance guide device having the above construction but includes various aspects and may be arbitrarily changed.

Further, in a medium in which the computer peripheral device maintenance guide program is recorded, to proceed with processing in accordance with such control by the program, the present invention lies at the root of the process procedure. Accordingly, it can be easily understood that the present invention can be applied to a method. The present invention according to claim 7 provides a computer peripheral device maintenance guide method to display guidance information indicative of a procedure of a maintenance operation for a computer peripheral device, in a computer to which the computer peripheral device is connected, the method comprising: a status change detection step of detecting a status change of the computer peripheral device; a progress acquisition step of acquiring progress of the maintenance operation, based on the status change of the computer peripheral device detected at the status change detection step; and a guidance display step of obtaining corresponding guidance information from a series of guidance information, provided corresponding to the progress of the maintenance operation in advance, based on the progress acquired at the progress acquisition step, and producing a screen display of the guidance information on the computer.

That is, the present invention is applicable not only to a medium having a material substance but also to a method.

BEST MODE FOR CARRYING OUT THE INVENTION

First Embodiment

Hereinbelow, a first embodiment of the present invention will now be described in accordance with the accompanying drawings.

Figure 1:
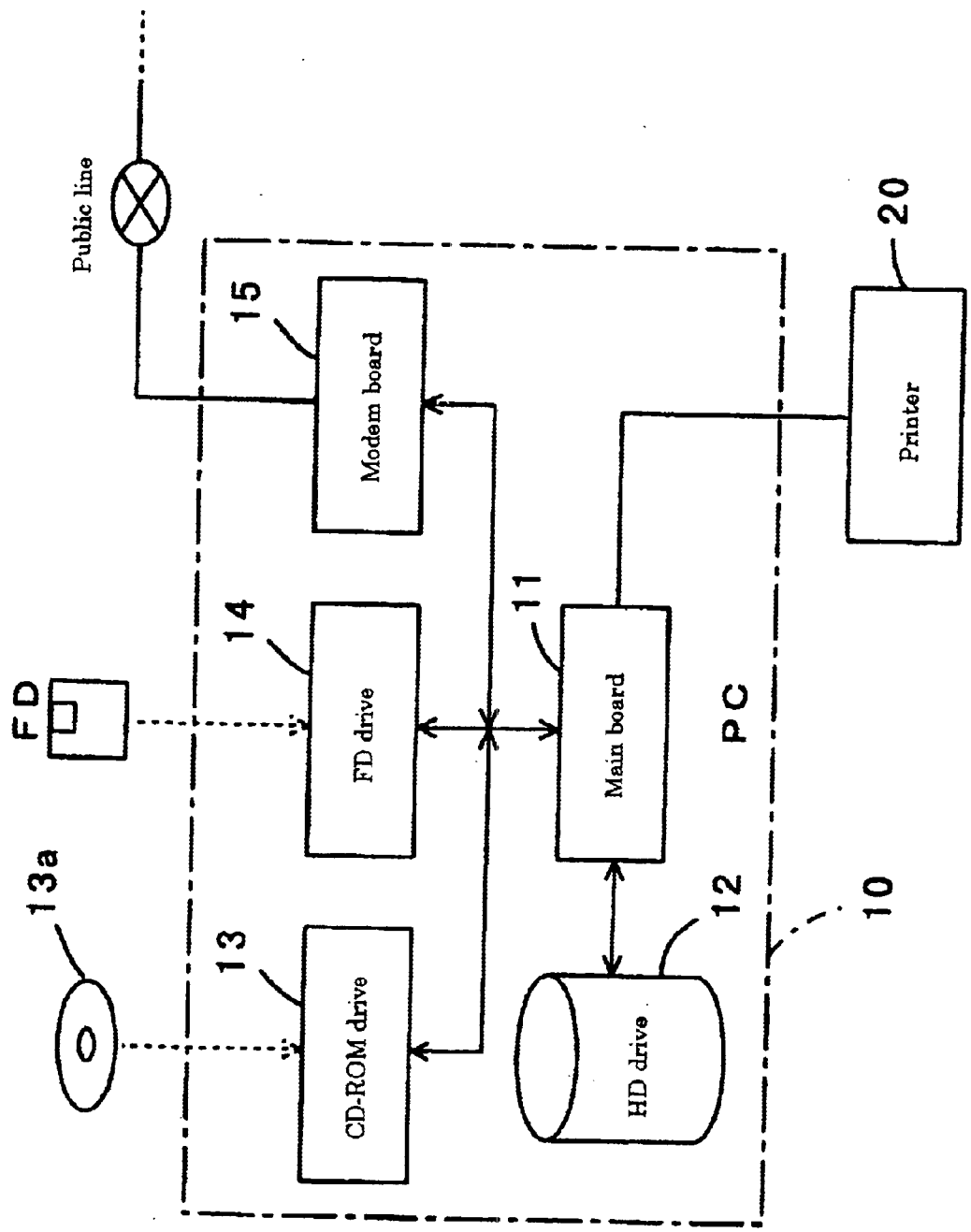
FIG. 1 is a block diagram showing a schematic construction of a computer according to a first embodiment of the present invention.
Figure 2:
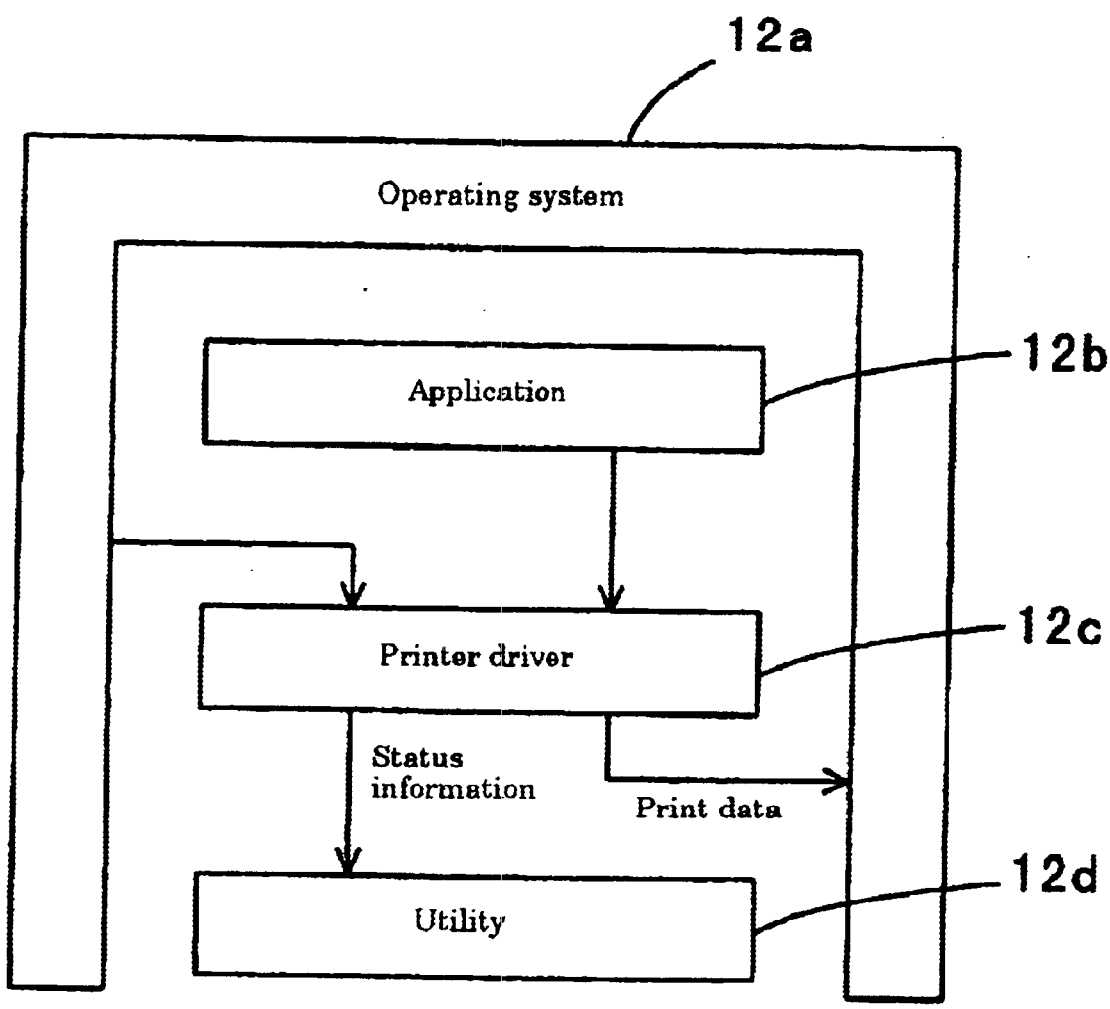
FIG. 2 is a schematic diagram showing various programs recorded in a hard disk of the computer in FIG. 1 and data flow among the program.

FIG. 1 is a block diagram schematically showing the hardware construction of a computer. FIG. 2 is a schematic diagram showing various programs recorded in a hard disk of the computer.

In these figures, a computer 10, comprising a main board 11 holding electronic parts such as a CPU, a ROM and a ROM (not shown), can execute programs, and controls operations of various hardware by the main board 11. Specifically, the computer 10 comprises a HD drive 12, a CD-ROM drive 13 and an FD drive 14. The computer 10 accesses these drive devices via an operating system 12a, and perform communication with an external device via a modem board 15. Further, the computer 10 has a display unit (not shown).

Further, a printer 20 as a peripheral device can be connected to the computer 10 via a printer interface (not shown) on the main board 11. In the execution of an application 12b on the above operating system 12a, when a print instruction is issued from the application 12b, predetermined print data is generated via a printer driver 12c. Note that the printer 20 in the present embodiment is an ink-jet color printer, and the printer driver 12c internally converts rasterized RGB multilevel data into CMYK multilevel data, then converts the CMYK multilevel data to binary data, and outputs the binary data to the printer 20.

In the printer 20, a paper support as a part of a sheet feeder (not shown) can be disassembled for convenience of storage. Upon shipment from factory, the paper support in disassembled status is packed. In this status, an ink cartridge is not attached to the printer. Accordingly, to use the printer 20, install operations such as assembly of the sheet feeder, attachment of the ink cartridge and cable connection must be performed.

Generally, as the procedures of these install operations of the printer are described in a book-style manual came with the printer, the install operations are performed by actually referring to the manual. However, it may be difficult for a user with no experience of such install work to understand the procedure. Accordingly, conventionally, a recording medium such as a setup CD-ROM in which a setup guide program is recorded is packed with the printer. The setup guide program is executed on the computer side, and a printer install operation procedures are displayed on the display unit. More practical explanation can be made by using photographs of actual installation and the like.

Figure 3:
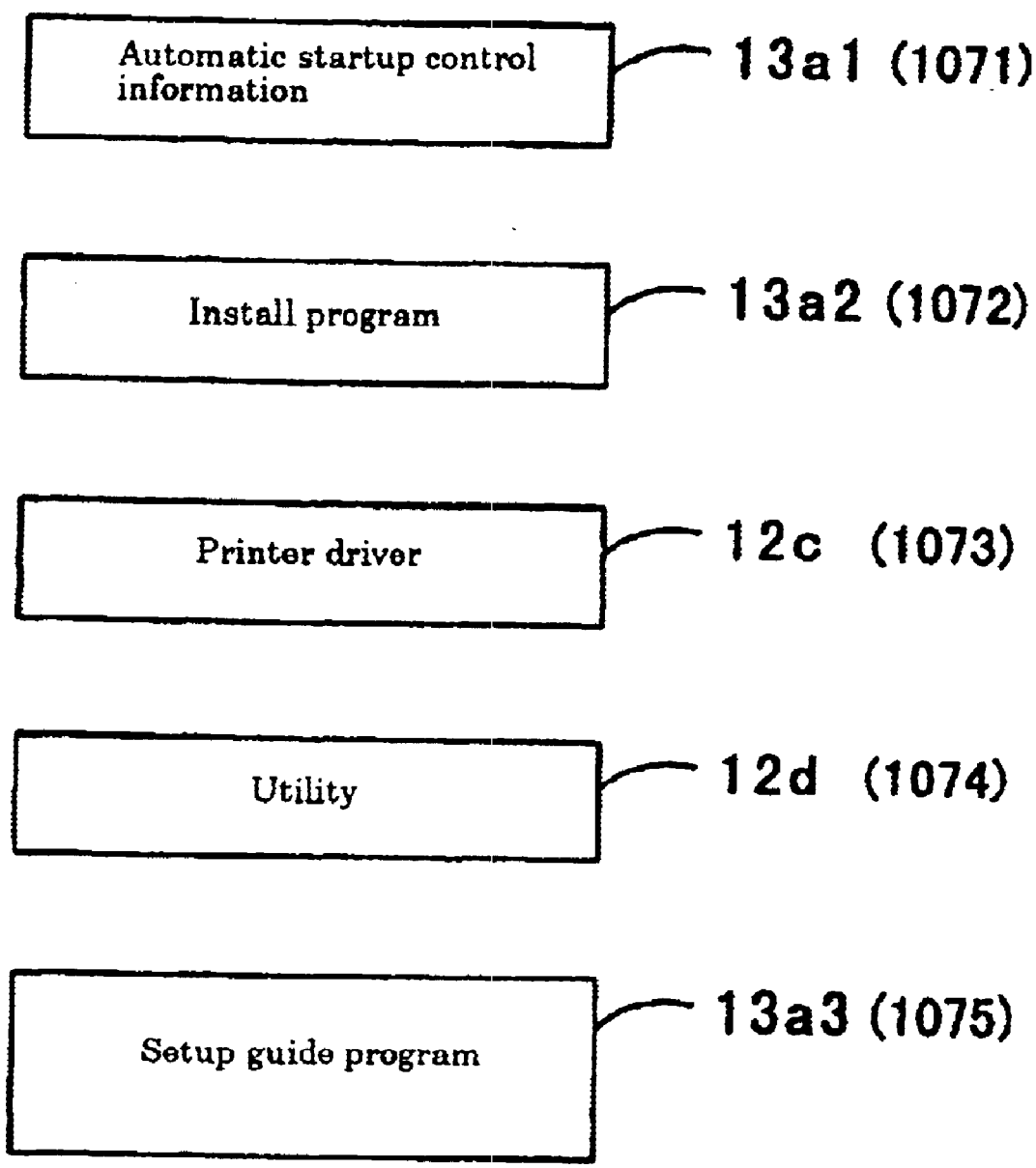
FIG. 3 is a block diagram showing the arrangement of the programs recorded in a setup CD-ROM.

The printer 20 employed in the present embodiment is also packed with a setup CD-ROM 13a having the program arrangement as shown in FIG. 3.

Figure 4:
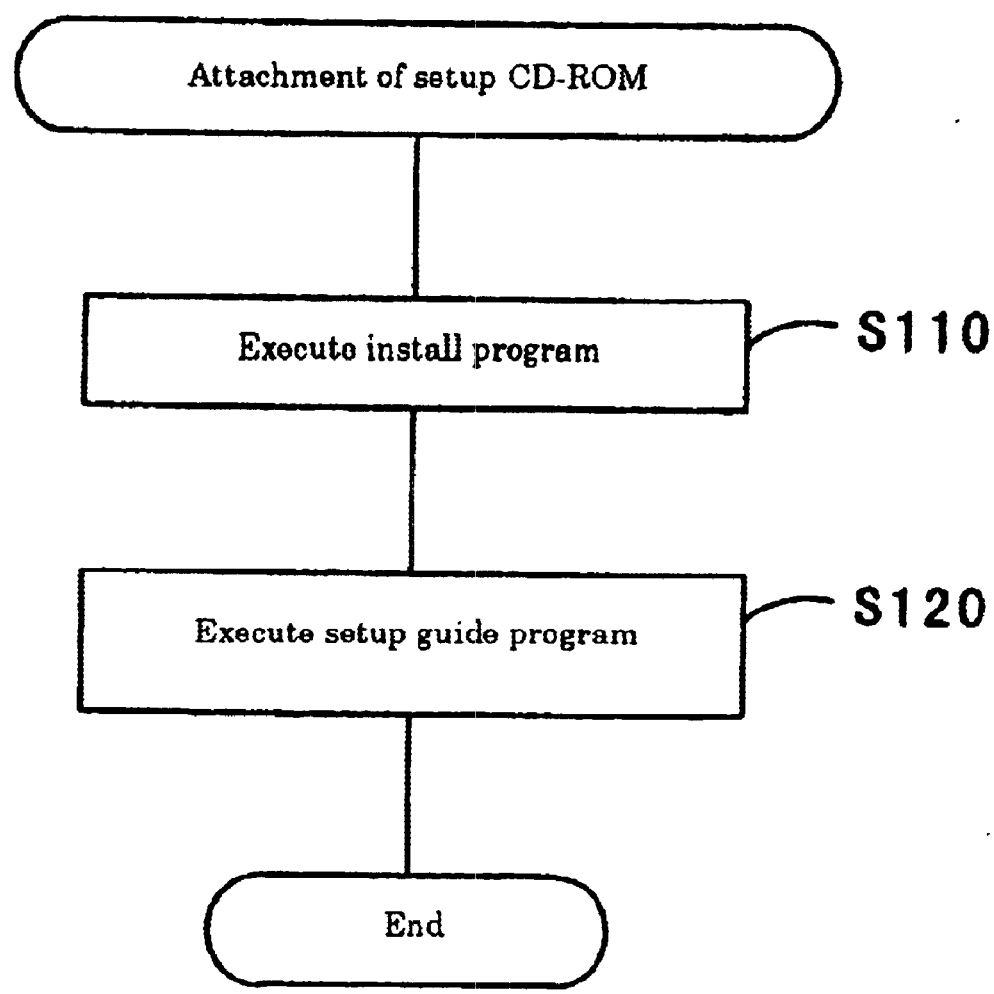
FIG. 4 is a flowchart showing a procedure for execution of the programs recorded in the setup CD-ROM.

In FIG. 3, the setup CD-ROM 13a contains automatic startup control information 13a1, an install program 13a2, the printer driver 12c, a utility 12d, and a setup guide program 13a3. The automatic startup control information 13a1 is control information to automatically start a specific program recorded in the setup CD-ROM 13a when the setup CD-ROM 13a is attached to the computer 10. More specifically, the automatic startup control information 13a1 is recorded in a predetermined recording area of the setup CD-ROM 13a. The operating system 12a detects attachment of the setup CD-ROM 13a and searches the above recording area, and if the automatic startup control information 13a1 exists, starts a predetermined program in accordance with the content of the information. In the present embodiment, as shown in the flowchart of FIG. 4, the install program 13a2 is started based on the automatic startup control information 13a1 at step S110.

The install program 13a2 is employed to install programs such as the printer driver 12c and the utility 12d recorded in the setup CD-ROM 13a into the computer 10. The install program 13a2 transfers the programs as the objects of installation to the HD drive 12 of the computer 10 at step S110, and performs other processing such as an initialization file setting. The utility 12d has functions to produce a screen display indicating the amount of residual ink in the ink cartridge attached to the printer 20, and to produce a screen display indicating an error such as paper jam in the printer 20. More specifically, the printer 20 outputs status information indicative of the status of the printer 20 including the above-described amount of residual ink, the error and the like, and on the computer side, the status information is obtained via the printer driver 12c, and image display is performed by the utility 12d based on the status information.

Further, by using the utility 12d, head cleaning can be performed in the printer 20, and the setting of a color conversion table of the printer driver 12c can be changed. When the utility 12d performs head cleaning in the printer 20, the utility 12d transmits a head cleaning instruction command via the printer driver 12c to the printer 20. The printer 20 receives the head cleaning instruction command and performs head cleaning processing.

That is, the computer 10 and the printer 20 can perform bidirectional communication with each other via the printer driver 12c. The computer 10 transfers print data to the printer 20, and further, obtains the status information from the printer 20 and causes the printer 20 to perform head cleaning or the like.

Figure 5:
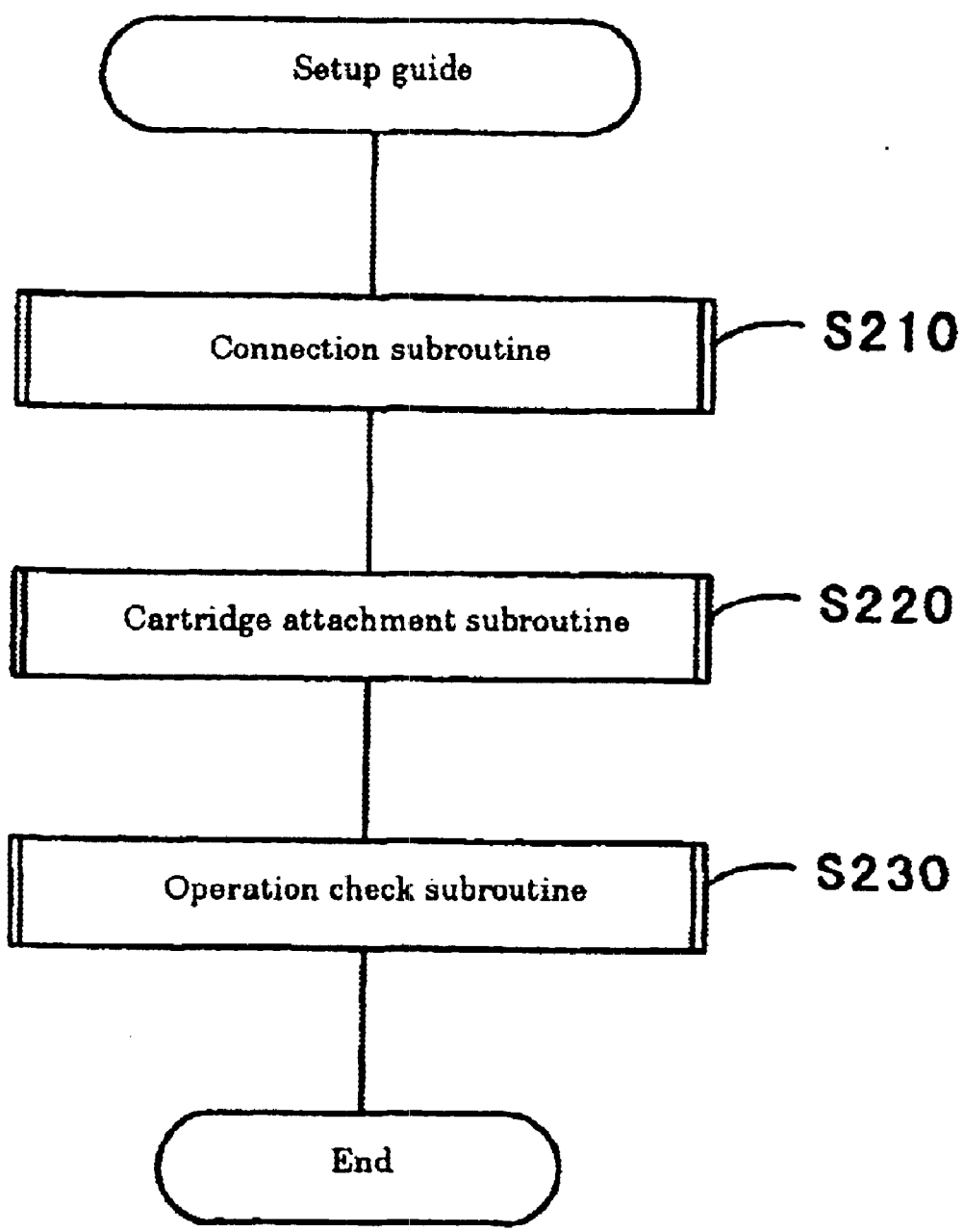
FIG. 5 is a flowchart showing a setup guide program according to the first embodiment.

When the install program 13a2 ends, the setup guide program 13a3 is started at step S120. As shown in the flowchart of FIG. 5, the setup guide program 13a3 internally executes "connection subroutine", "cartridge attachment subroutine" and "operation check subroutine" sequentially, and produces screen displays of guidance information relating to the install operations of the printer 20, thus assisting the user to smoothly perform installation (steps S210 to S230).

Figure 6:
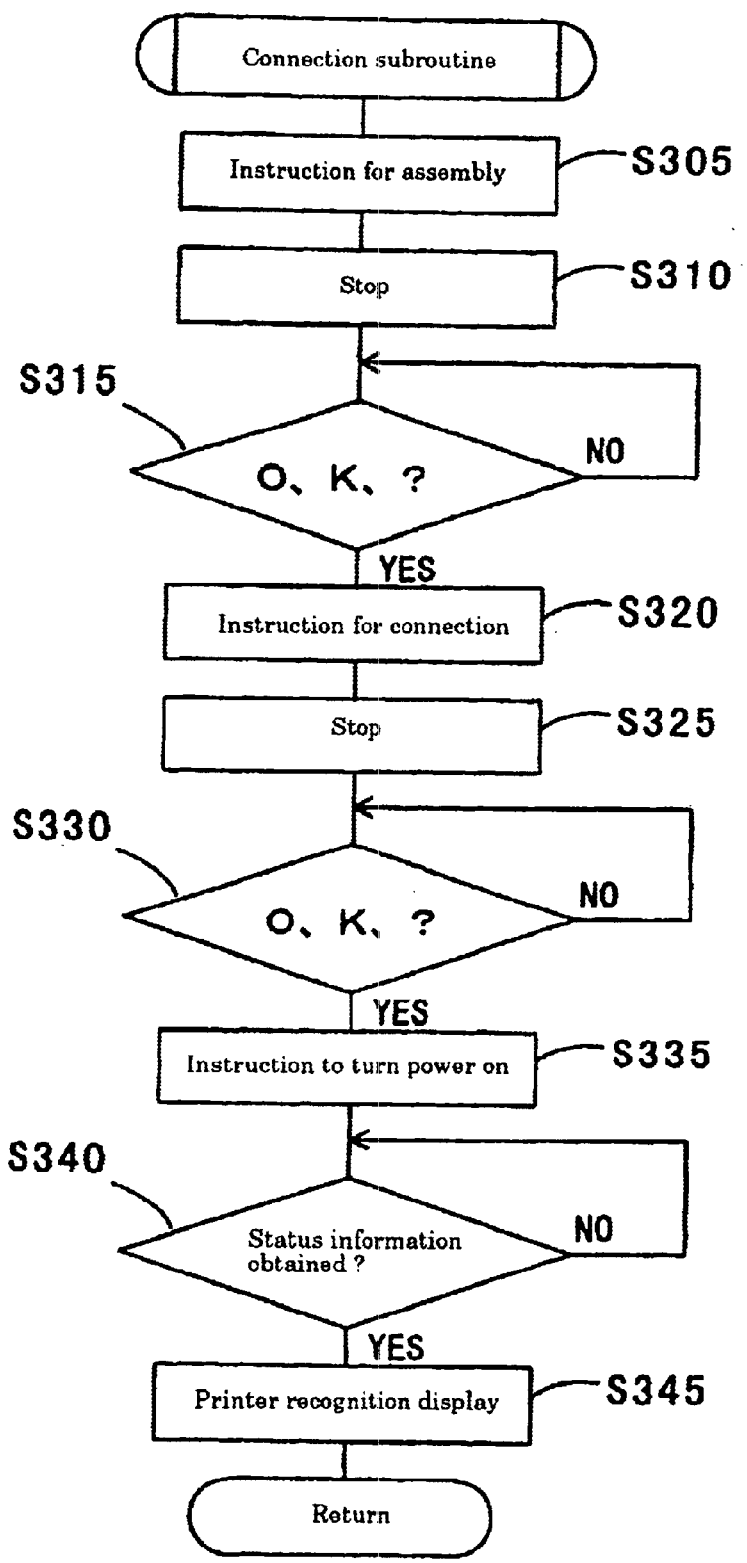
FIG. 6 is a flowchart showing a connection subroutine.

FIG. 6 is a flowchart showing the connection subroutine at step S210. At step S305, a method for assembling the above-described paper support, with audio guidance, is displayed by using photographs and the like. Then at step S310, the movement of the moving picture is temporarily stopped. The user watches the displayed content and actually assembles the paper support. When the assembly operation has been completed, the user inputs acknowledgment (OK). The setup guide program 13a3 detects the input at step S315. At step S320, similarly, a screen display indicating a method for connecting a power source cable and a method for connecting an interface cable between the computer 10 and the printer 20 is produced, and the movement of the moving picture is temporarily stopped at step S325. Similarly, the user watches the displayed content and performs actual connection operation, then when the connection operation has been completed, inputs acknowledgment (OK). Then, similarly, the setup guide program 13a3 detects the input at step S330. At step S335, a screen display indicating a method for turning the power of the printer 20 on is produced.

If the user turns the power of the printer 20 on, the printer 20 reads predetermined firm ware from a nonvolatile memory (not shown) into a work area. When the reading has been completed, the printer 20 diagnoses its status at predetermined intervals, and outputs the diagnosis as the status information to the computer 10. Accordingly, when the computer 10 can receive the status information via the printer driver 12c, it can be determined that the printer 20 has normally started. Then at step S340, if the setup guide program 13a3 determines that the status information from the printer 20 has been obtained, the program displays a message indicating that the printer 20 has been recognized at step S345, and terminates the connection subroutine. Note that the printer driver 12c is installed by the install program 13a2 before the setup guide program 13a3 is executed such that the setup guide program 13a3 performs communication with the printer 20 by utilizing the printer driver 12c.

Figure 7:
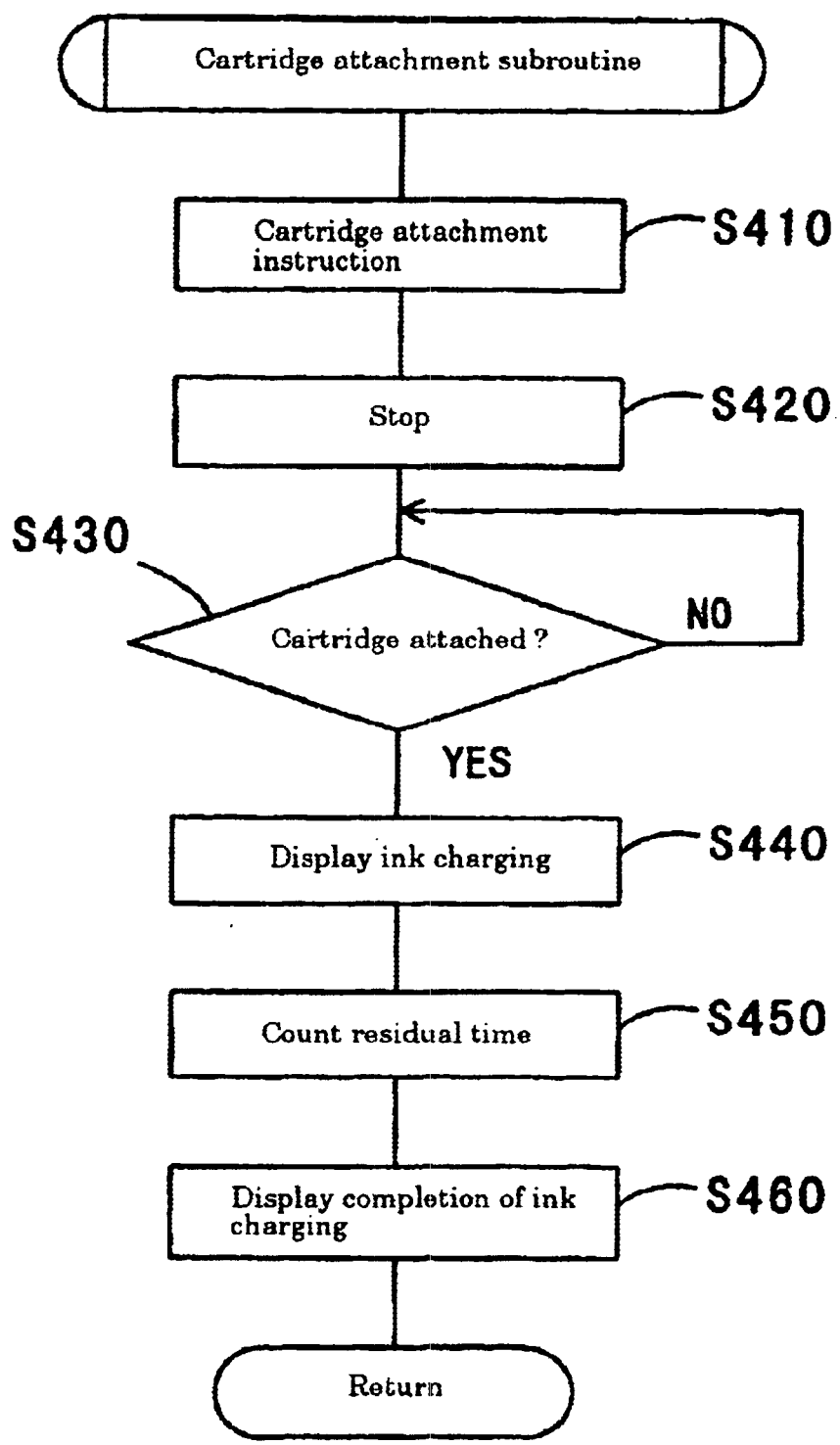
FIG. 7 is a flowchart showing a cartridge attachment subroutine.

When the setup guide program 13a3 terminates the connection subroutine at step S210, then at step S220, executes the cartridge attachment subroutine. FIG. 7 shows the cartridge attachment subroutine as a flowchart. At step S410, a method for attaching an ink cartridge, with audio guidance, is displayed by using photographs and the like. At step S420, the movement of the moving picture is temporarily stopped.

Then, the user watches the displayed content and attaches the ink cartridge to a predetermined position of the printer 20.

As described above, the printer 20 diagnoses its status at predetermined intervals, and if it detects attachment of the ink cartridge, it starts ink charging to nozzles (not shown), generates status information indicating that ink charging is being performed, and transmits the status information to the printer 10. The setup guide program 13a3 monitors the status information obtained via the printer driver 12c. If the setup guide program 13a3 detects based on the status information that the ink charging is being performed at step S430, it displays an image indicating that the ink charging is being performed at step S440. At step S450, the setup guide program 13a3 produces a screen display of the residual time by the completion of ink charging while counting down the time. As the time necessary for ink charging is unique to the printer 20 depending on printer model, the time necessary for ink charging is empirically obtained in advance, and the counting down is started with the time as an initial value. When the counting down has ended, the setup guide program 13a3 produces a screen display indicating that the ink charging has completed at step S460, and terminates the cartridge attachment subroutine.

Figure 8:
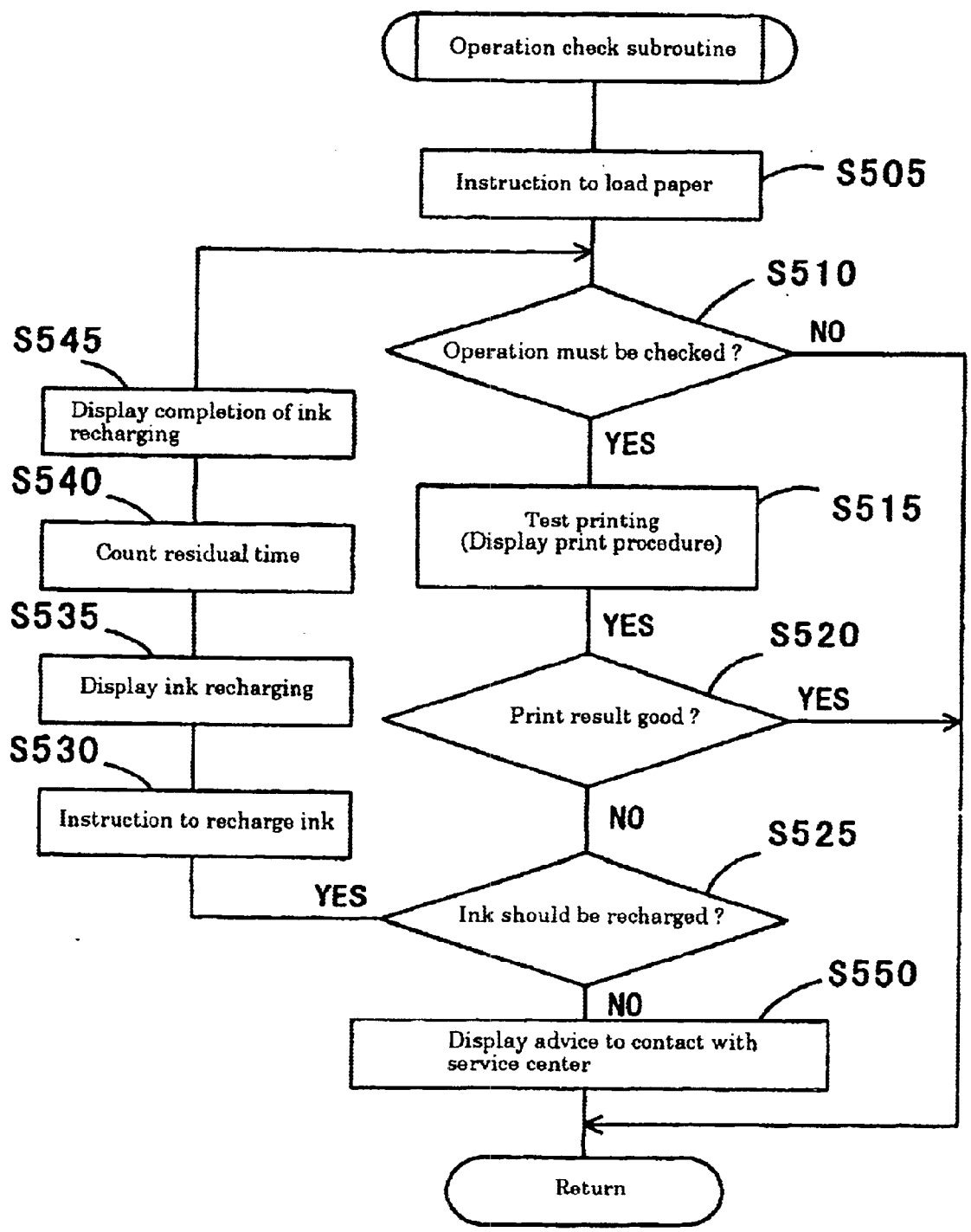
FIG. 8 is a flowchart showing an operation check subroutine.

When the setup guide program 13a3 terminates the cartridge attachment subroutine, it executes the operation check subroutine at step S230. FIG. 8 shows the operation check subroutine as a flowchart. At step S505, a screen display indicating a method for loading paper is produced, and at step S510, a selection image for selecting whether operation check should be made or not is displayed. If the operation check is selected, the setup guide program 13a3 performs test printing at step S515 by using the print data previously prepared.

Figure 9:
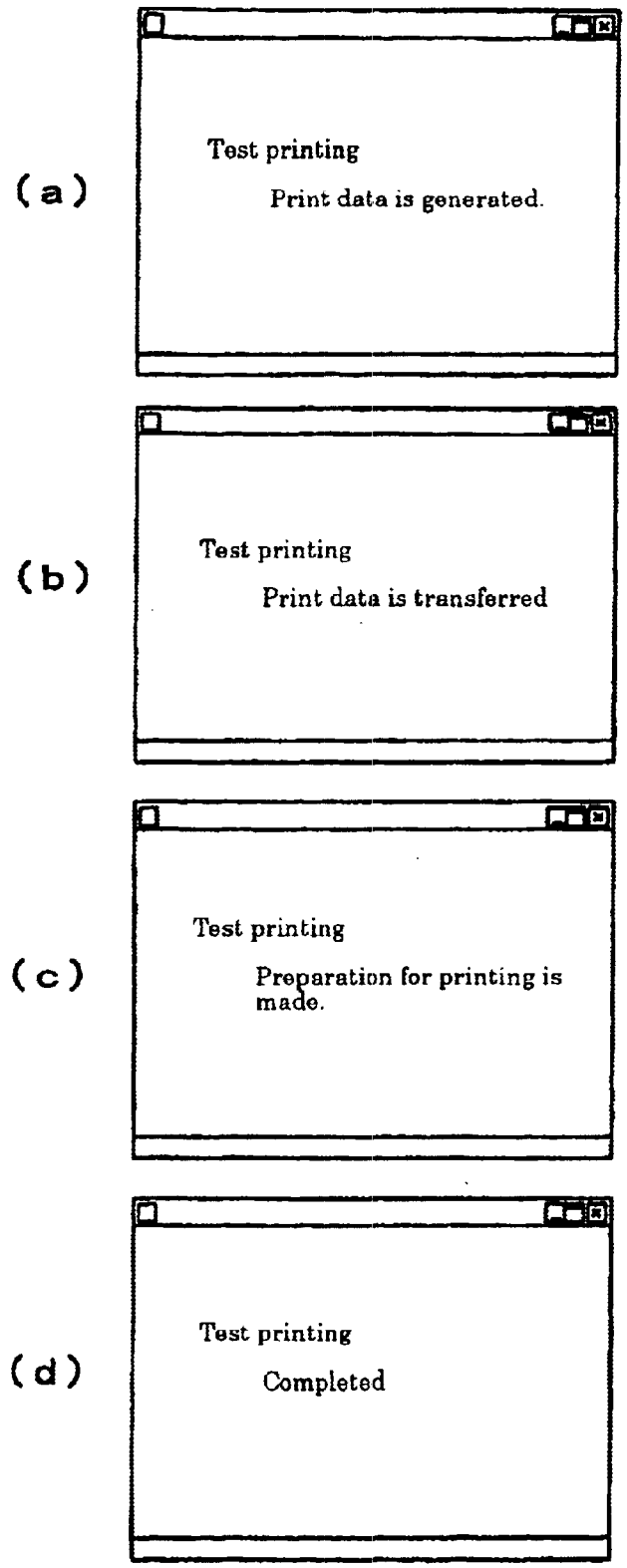
FIGS. 9A to 9D are diagrams showing the progress of change of screen display in test printing.

As it is well known, a print procedure of the printer 20 approximately includes print data generation by the printer driver 12c, transfer of the generated print data to the printer 20, mapping of the received print data in a memory of the printer 20, and output of the print data mapped in the memory. Upon test printing at step S515, the flow of the print procedure is sequentially displayed as shown in FIGS. 9A to 9D. The generation of print data as shown in FIG. 9A and the transfer of print data as shown in FIG. 9B are steps which can be detected from the printer driver 12c, and sequentially displayed in accordance with the results of actual detection of these operations. On the other hand, print preparation as shown in FIG. 9C includes print data memory mapping, warm-up processing and the like, on the printer 20 side. These statuses of the printer 20 including the completion of printing as shown in FIG. 9D can be obtained from the above-described status information. The operations are sequentially displayed based on the status information. Accordingly, even if the user lacks basic knowledge of the printer 20 when he/she conducts the installation, the user understands the outline of the print procedure upon test printing, and can more deeply understand the printer 20.

Figure 10:
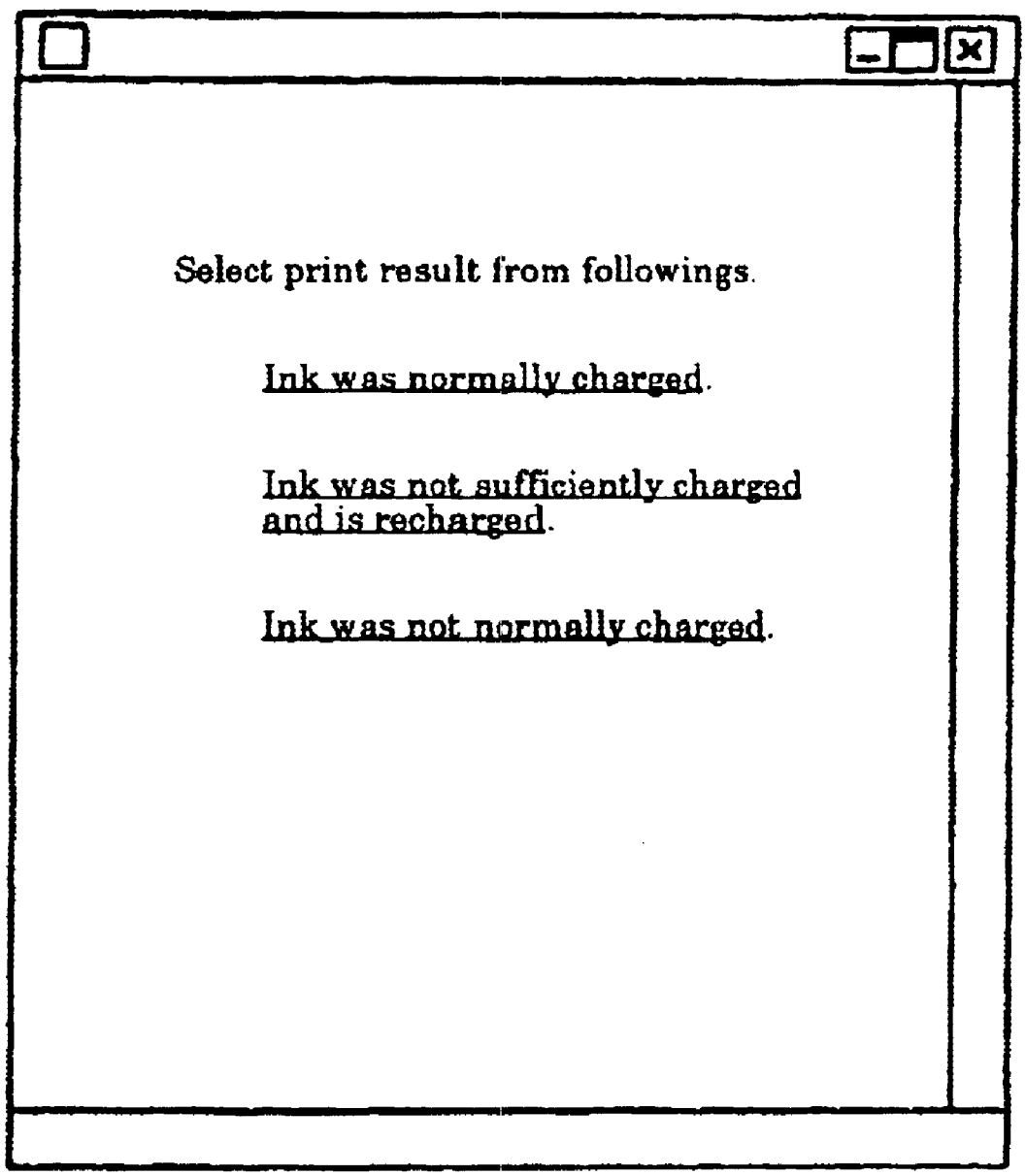
FIG. 10 is a diagram showing a display image when an evaluation of the result of test printing is inputted.

The setup guide program 13a3 that has executed the above-described test printing processing, displays an image as shown in FIG. 10 at step S520, for the user's selection as to whether the result of printing is good or not. In this image, the user can select one of three displayed items by click operation. For example, if the result of printing is not good, the user selects the second item (ink recharging). Then, the setup guide program 13a3 detects the selection at step S525, and instructs the printer 20 to recharge ink into the ink cartridge at step S530. More specifically, the setup guide program 13a3 transmits a predetermined command to the printer 20 via the printer driver 12c. Then in response to the command, the printer 20 starts recharging. Thereafter, at steps S535 to S545, as described above, a screen display indicating that ink recharging is being performed is produced, then a screen display indicating that the ink recharging has been completed is produced. The process returns to step S510 to perform similar processing.

When the result of printing is not good, the printhead may be clogged, or there may be an error in the setting of the color conversion table of the printer driver 12c. The probability that such error has occurred in the process of installation of the printer 20 is very low. Accordingly, in the present embodiment, ink recharging is performed. However, processing to be performed is not limited to the ink recharging but any other processing may be performed.

After the ink recharging, if the result of test printing has not been improved, in the selection image as shown in FIG. 10, the third item (ink charging abnormality) is selected. Then, at step S550, a screen display indicating that contact must be established with a service center and/or sales shop is produced. The display image may show a telephone number and/or a mail address of the service center. Further, it may be more useful for the user if it is arranged such that a predetermined flag is set upon execution of ink recharging at step S530, and the second item in the selection image in FIG. 10 is unselectably displayed if the flag is set.

Next, the operation of the present embodiment constructed as above will be described.

When the printer 20 is installed into the system of the computer 10, the user attaches the setup CD-ROM 13a came with the printer 20 to the CD-ROM drive 13. Then, the operating system 12a detects attachment of the setup CD-ROM 13a, searches for the automatic startup control information 13a1 recorded in the predetermined recording area. In accordance with the content of the automatic startup control information 13a1, first, the install program 13a2 is executed, to install the printer driver 12c and the utility 12d into the computer 10 (step S110).

When the install program 13a2 has ended, next, the setup guide program 13a3 is executed (step S120). The setup guide program 13a3 is employed to sequentially produce screen displays of guidance information related to the install operation of the printer 20. First, the connection subroutine is executed (step S210). In the connection subroutine, the method for assembling the paper support of the printer 20, with audio guidance, is displayed by using photographs and the like, and the movement of the moving picture is temporarily stopped (steps S305 and S310) Then, the user watches the displayed content and actually assembles the paper support. When the assembly operation has been completed and the user inputs acknowledgment, the displayed content proceeds with consequent content (step S315). Similarly, as the method for connecting the power cable and the like and the method for turning the power of the printer 20 on are displayed, the user performs actual operations while watching the displayed contents (steps S320 to S335).

When the power of the printer 20 is turned on, the printer 20 reads special-purpose firmware from the nonvolatile memory (not shown) into the work area, diagnoses its status at predetermined intervals and generates the diagnosis as the status information, and transmits the status information to the computer 10 side. When the computer 10 obtains the status information from the printer 20 via the printer driver 12c (step S340), it produces a screen display indicating that the printer 20 has been recognized, and terminates the connection subroutine (step S345).

Thereafter, the setup guide program 13a3 executes the cartridge attachment subroutine (step S220). Similarly, in the cartridge attachment subroutine, the method for attaching the ink cartridge is displayed, and the movement of the moving picture is temporarily stopped (steps S410 and S420). Then the user watches the displayed content and attaches the ink cartridge to the printer 20. Then the printer 20 detects attachment of the ink cartridge, starts ink charging to the nozzles, and transmits the status information indicating that ink charging is being performed to the computer 10. The computer 10 side detects from the status information that ink charging is being performed in the printer 20 (step S430), produces a screen display indicating the status, and displays the residual time by the completion of ink charging while counting down the time (steps S440 and S450). Then, when the count down has ended, the computer 10 produces a screen display indicating the completion of ink charging, and terminates the cartridge attachment subroutine (step S460).

Thereafter, the setup guide program 13a3 executes the operation check subroutine (step S230). In the operation check subroutine, first, a screen display indicating the method for loading paper is produced (step S505), and a selection image for selecting whether operation check is performed or not is displayed (step S510). If the user selects the operation check, the setup guide program 13a3 performs test printing by using previously prepared print data. At this time, the setup guide program 13a3 sequentially displays the print procedure as shown in FIGS. 9A to 9D (step S515). Accordingly, even if the user who lacks basic knowledge of the printer 20 when he/she conducts the installation, the user understands the outline of the print procedure upon test printing, and can more deeply understand the printer 20.

When the test printing has been completed, the setup guide program 13a3 displays an image as shown in FIG. 10 for the user's selection as to whether the result of printing is good or not (step S520) If the result of printing is good, the user selects the first item, to terminate the setup guide program 13a3. On the other hand, if the result of printing is not good, the user selects the second item. Then, the setup guide program 13a3 transmits the predetermined command to the printer 20 via the printer driver 12c, to perform ink recharging (steps S525 and S530).

In the ink recharging, a screen display indicating that the ink recharging is being performed is produced (step S535), and the residual time being counted down is displayed (step S540). When the ink recharging is completed, a screen display indicating that the ink recharging has been completed is produced (step S545) Thereafter, test printing is performed again (step S510) and if the result of printing has not been improved (step S515), the user selects the third item in the selection image as shown in FIG. 10 (step S520). In this case, the setup guide program 13a3 produces a screen display indicating that contact must be established with the service center and/or the sales shop (step S550), the user makes contact with the service center and/or the sales shop.

Second Embodiment

Next, a second embodiment of the present invention will be described with reference to the drawings.

Figure 11:
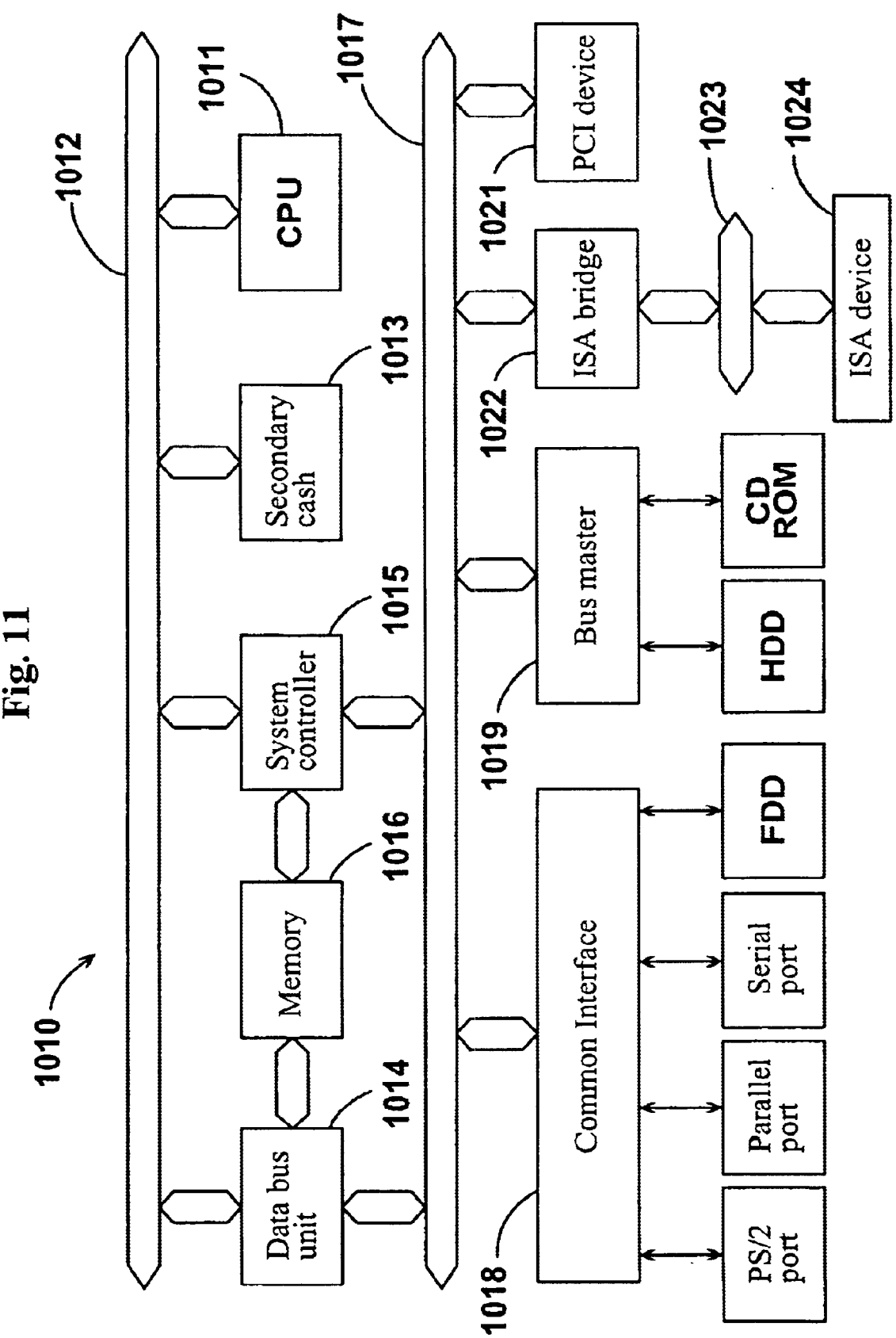
FIG. 11 is a block diagram showing a schematic construction of the computer according to a second embodiment of the present invention.

FIG. 11 is a block diagram showing a schematic construction of the computer according to the second embodiment of the present invention. In FIG. 11, a computer 1010 has a CPU 1011 which serves as the nerve center of computation. The CPU 1011 is connected to a secondary cash 1013, a data bus unit 1014 and a system controller 1015 via a CPU bus 1012. In recent years, computers have increased a clock speed of the CPU bus 1012 to improve processing performance. The CPU 1011 accesses a slow memory 1016 via the data bus unit 1014 or the system controller 1015. Note that the memory 1016 includes a ROM area such as a BIOS area and a RAM area.

Similarly, as interfaces and the like cannot be directly connected to the fast CPU bus 1012, they are connected to the data bus unit 1014 and the system controller 1015 via a PCI bus 1017 which is a general-purpose high-speed bus. The PCI bus 1017 is connected to a common interface 1018 for connection with a floppy disk, as well as a communication interface for a PS/2 port, a parallel port and a serial port directly owned by the computer 1010, and connected to a bus master 1019 connected to a hard disk requiring high-speed operation and a CD-ROM for DMA transfer.

The PCI bus 1017 can be directly connected to a PCI device 1021, further, can be connected to an ISA bus 1023 which is an old-type general-purpose bus for communication with a narrow data-width, via an ISA bridge 1022, such that the PCI bus 1017 can be connected to an ISA device 1024 via the ISA bus 1023.

Figure 12:
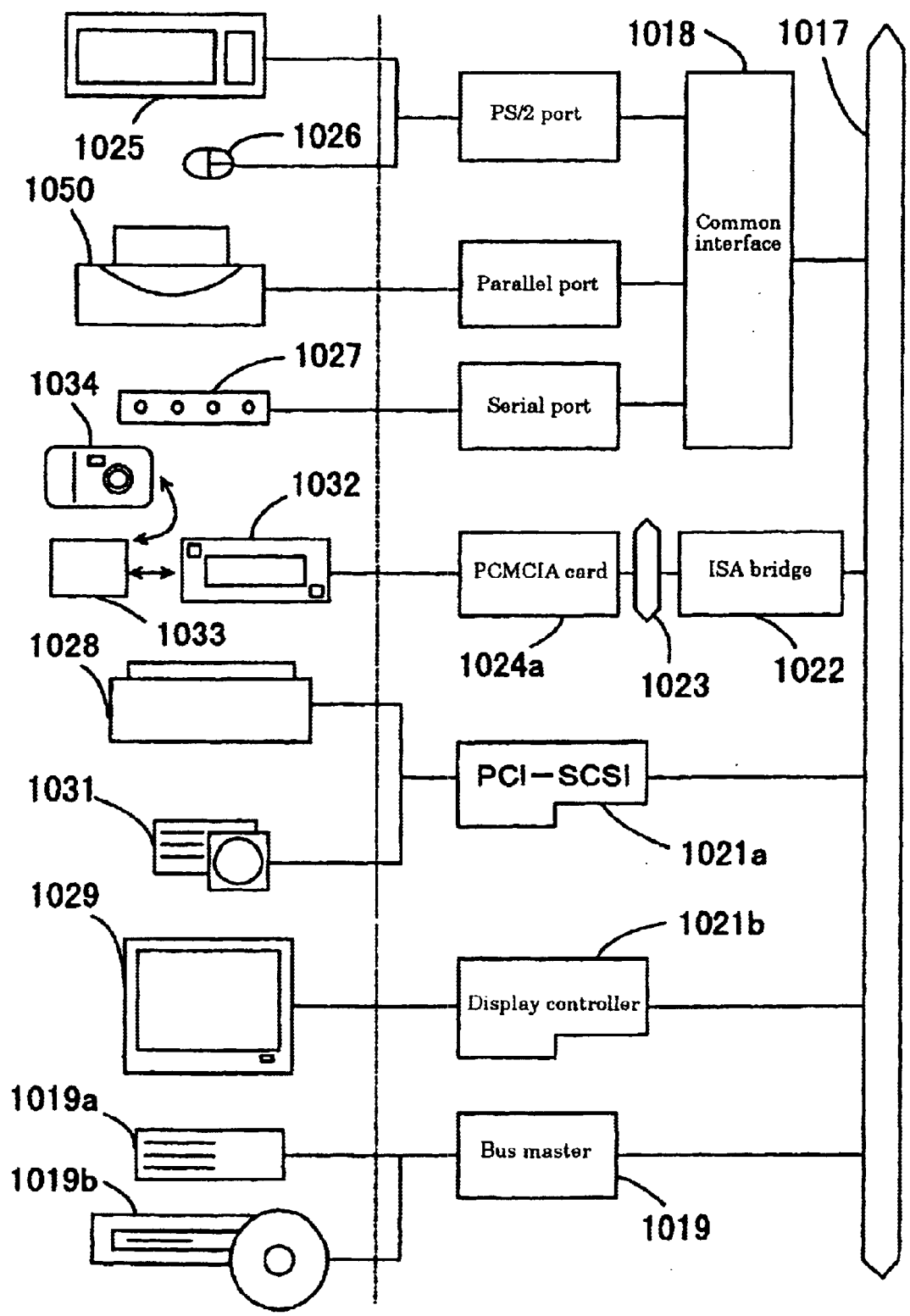
FIG. 12 is a block diagram showing the connection between the computer and peripheral devices.

FIG. 12 shows peripheral device of the computer 1010. A keyboard 1025 and a mouse 1026 are connected to the common interface 1018 via the PS/2 port; a printer 1050 is connected to the common interface 1018 via the parallel port; and a modem 1027 is connected to the common interface 1018 via the serial port. A scanner 1028 is connected to the PCI bus 1017 via a SCSI card 1021a as a PCI device 1021. Various external devices can be connected to the SCSI card 1021a. For example, an magneto-optic storage device 1031 is connected to the SCSI card 1021a. Further, a display 1029 is connected to the PCI bus 1017 via a display controller card 1021b. A hard disk 1019a and a CD-ROM drive 1019b are connected to the PCI bus 1017 via the bus master 1019.

As the ISA device 1024, various devices can be provided. A PCMCIA card 1024a is connectable to a PCMCIA card socket 1032 to which a memory card 1033 can be attached, to facilitate data input/output. The memory card 1033 can easily input data from a digital still camera 1034 or a mobile computer and the like.

The computer 1010 can be connected to an external display via a video card, in addition to these devices, and can be connected to a LAN card so as to be connected to a network, and further, can be connected to another external device via an infrared communication device.

Figure 13:
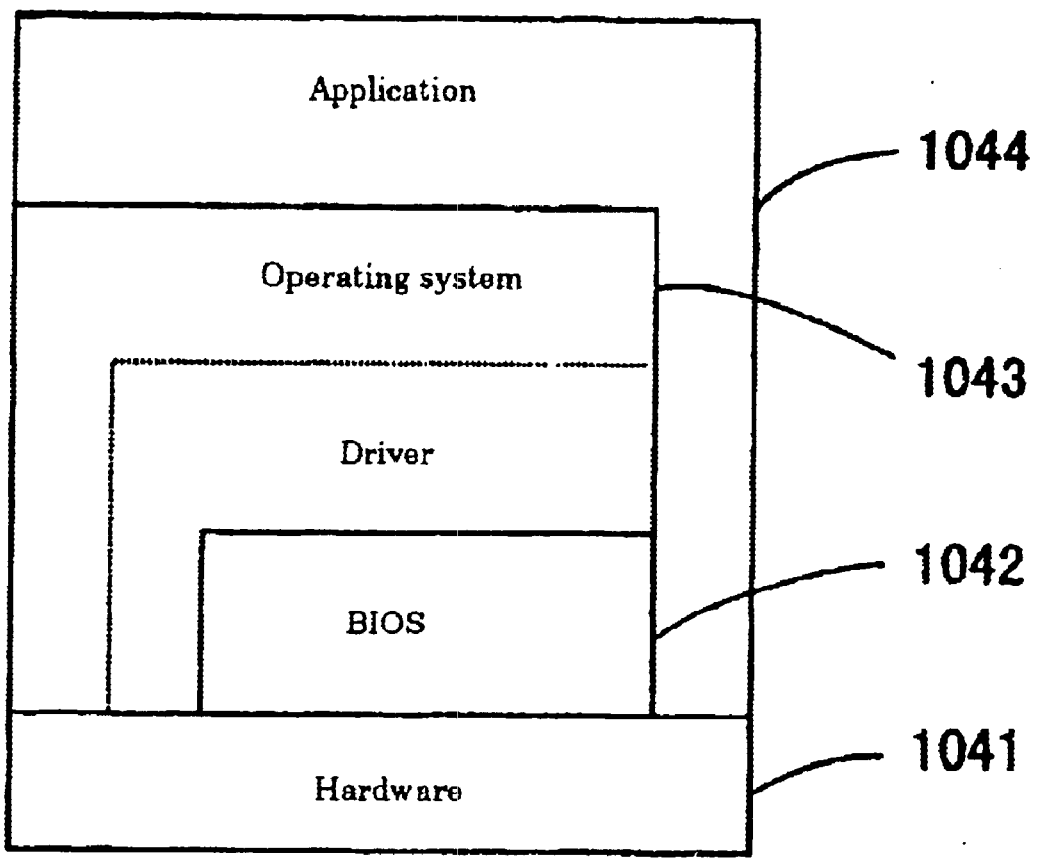
FIG. 13 is a schematic diagram showing the structure of software in the computer.

The hardware construction of the computer system is as described above, with which software as shown in FIG. 13 is executed on the computer 1010. That is, a BIOS 1042 is executed on the basis of hardware 1041, and in its upper layer, an operating system 1043 and an application 1044 are executed. Basically, the operating system 1043 access the hardware 1041 directly or via the BIOS 1042, and the application 1044 transmits/receives data to/from the hardware 1041 via the operating system 1043. For example, to read data from the hard disk 1019a, the application 1044 accesses the hardware 1041 via the operating system 1043. Further, various drivers for controlling the hardware 1041 may be installed into the operating system 1043. The installed drivers perform various control as parts of the operating system 1043. As the drivers, a display driver to control display on an external display device via a video card, a printer driver to perform print control on the printer 1050 and the like are installed.

Figure 14:
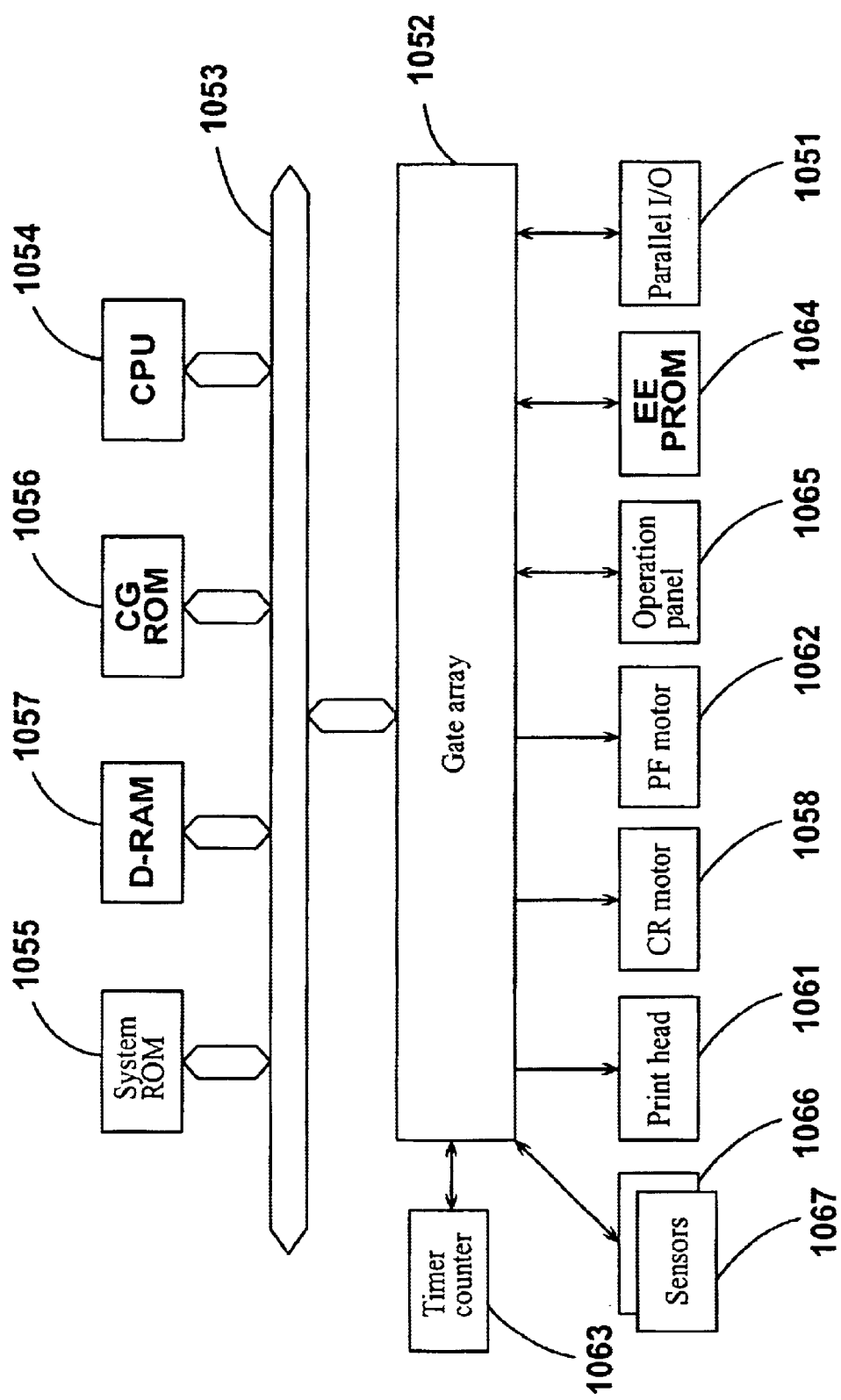
FIG. 14 is a block diagram showing a schematic construction of a printer.

On the other hand, FIG. 14 shows the schematic construction of the printer 1050. The printer 1050 has a parallel I/O 1051 for connection with the parallel port of the computer 1010, and transmits/receives commands and print data by parallel communication. The parallel I/O is an interface enabling bidirectional communication such as nibble, ECB and EPP. The parallel I/O 1051 is connected to a gate array 1052, and connected to a bus 1053 via the gate array 1052. A CPU 1054, a system ROM 1055, a character generating (CG) ROM 1056 and a D-RAM 1057 are interconnected to the bus 1053. The CPU 1054 executes a printer control program written in the system ROM 1055 while using the D-RAM 1057 as a work area, and performs printing by utilizing font data and the like written in the CG ROM 1056.

The printer 1050 in the second embodiment is a color ink-jet printer which performs printing by using four color ink, cyan (C) ink, magenta (M) ink, yellow (Y) ink and black (K) ink, and two light color ink, light cyan (c) ink and light magenta (m) ink. A concrete printing mechanism is electrically controlled via the gate array 1052. Printing is performed on approximately the entire surface of print paper by moving a printhead 1061 forward/backward (main-scanning) by a carriage motor 1058 upon discharging necessary color ink, while feeding (subscanning) the paper by a paper feed (PF) motor 1062. To perform actual printing, print paper is set in a predetermined paper support in advance. Then, the paper feed motor 1062 captures the paper and feeds it.

A printhead 1061 comprises six printhead units corresponding to the C, c, M, m, Y and K color ink, and each printhead unit is supplied with corresponding color ink from an ink cartridge attached to the printer 1050 and can discharge the color ink independently. In the present embodiment, a micropump mechanism to discharge color ink by utilizing piezo devices as electrostriction transducers is employed, however, a mechanism to discharge color ink by utilizing a bubble expansion pressure may be employed. Further, the printer 1050 uses the color ink of six C, c, M, m, Y and K colors, however, the printer may use four C, M, Y, K color ink.

The gate array 1052 connected to the printhead 1061 is also connected to a timer counter 1063 which generates a clock or the like to be used by the system, a nonvolatile EEPROM 1064 for storing settings, and an operation panel 1065. Further, the gate array 1052 is connected to a residual ink sensor 1066 for detecting the amount of residual ink in an actually attached ink cartridge and a paper sensor 1067 for detecting shortage of print paper in the paper support. The printer 1050 detects ink shortage and paper shortage by utilizing outputs from these sensors, and notifies the user of the ink shortage and paper shortage by blink of an LED (not shown).

A part of the paper support of the printer 1050 can be disassembled, and upon shipment from factory, the paper support in disassembled status is packed. Accordingly, to install the printer 1050 into the computer system, install operations such as assembly of paper support, connection of AC cable and interface cable must be performed. Generally, the procedures of such printer install operations are described in a book-style manual came with the printer. The user performs actual install operations by referring to the manual. In the present embodiment, the user performs the assembly of paper support, the connection of AC cable and interface cable while referring to the manual.

In the manual, there is a description "When the connection of the interface cable has been completed, turn the power of the computer on, and set the setup CD-ROM in the package." Then the user turns the power of the computer 1010 on and attaches the setup CD-ROM to the CD-ROM drive 1019b, in accordance with the instruction of the manual. The setup CD-ROM has a program arrangement as shown in FIG. 3, comprising automatic startup control information 1071, an install program 1072, a printer driver 1073, a utility 1074 and a setup guide program 1075. Similarly, in the present embodiment, when the setup CD-ROM is attached to the CD-ROM drive 1019b, the programs are executed in accordance with the flowchart of FIG. 4.

That is, in the present embodiment, the install program 1072 is executed by the computer 1010 at step S110, and the programs such as the printer driver 1073 and the utility 1074 are installed into the computer 1010.

The printer driver 1073 generates predetermined print data in cooperation with the operating system 1043, and transmits the print data to the printer 1050 to perform printing. Accordingly, in this meaning, the computer 1050 may perform unidirectional communication with the printer 1050, however, in the present embodiment, bidirectional communication is possible between the computer 1010 and the printer 1050 by the printer driver 1073. The printer 1050 side outputs sensor outputs from the residual ink sensor 1066 and the paper sensor 1067 and various error outputs, as status information, to the computer 1010.

On the other hand, the utility 1074 obtains the status information via the printer driver 1073, and produces a screen display indicating the amount of residual ink in the printer 1050 or produces a screen display indicating an error such as paper shortage or paper jam in the printer 1050, based on the status information. Further, the utility 1074 can be utilized to cause the printer 1050 to perform cleaning on the printhead 1061, or to perform setting on a color conversion table of the printer driver 1073. When the utility 1074 performs cleaning on the printhead 1061, the utility transmits a predetermined cleaning instruction command to the printer 1050 via the printer driver 1073. Then, the printer 1050 receives the cleaning instruction command by the gate array 1052, and performs predetermined head cleaning processing. Note that in the present embodiment, the head cleaning processing can be performed independently on the black-ink printhead unit and other color ink printhead units.

Figure 15:
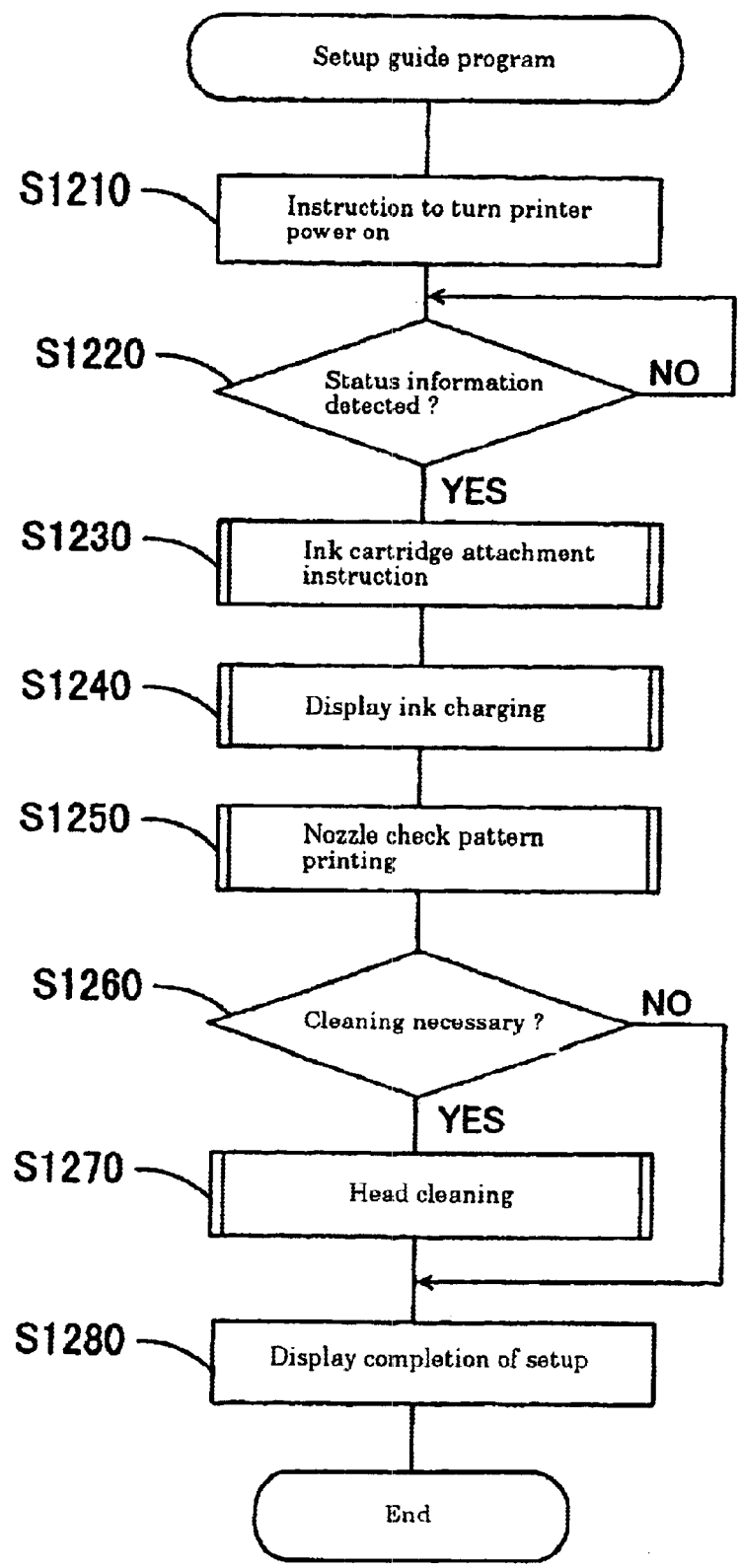
FIG. 15 is a flowchart showing the setup guide program according to the second embodiment.

Returning to the description of the setup CD-ROM, at step S110, the install program 1072 is executed, and when the installation of the printer driver 1073 and the utility 1074 have been completed, the setup guide program 1075 is executed at step S120. FIG. 15 is a flowchart showing the setup guide program according to the second embodiment. At step S1210, an image instructing to turn the power of the printer 1050 on is displayed, and at step S1220, the program waits until the status information is obtained from the printer 1050 via the installed printer driver 1073. That is, if the status information can be obtained, the power of the printer 1050 is on. At step S1220, it is determined whether or not the power of the printer 1050 is on.

Figure 16:
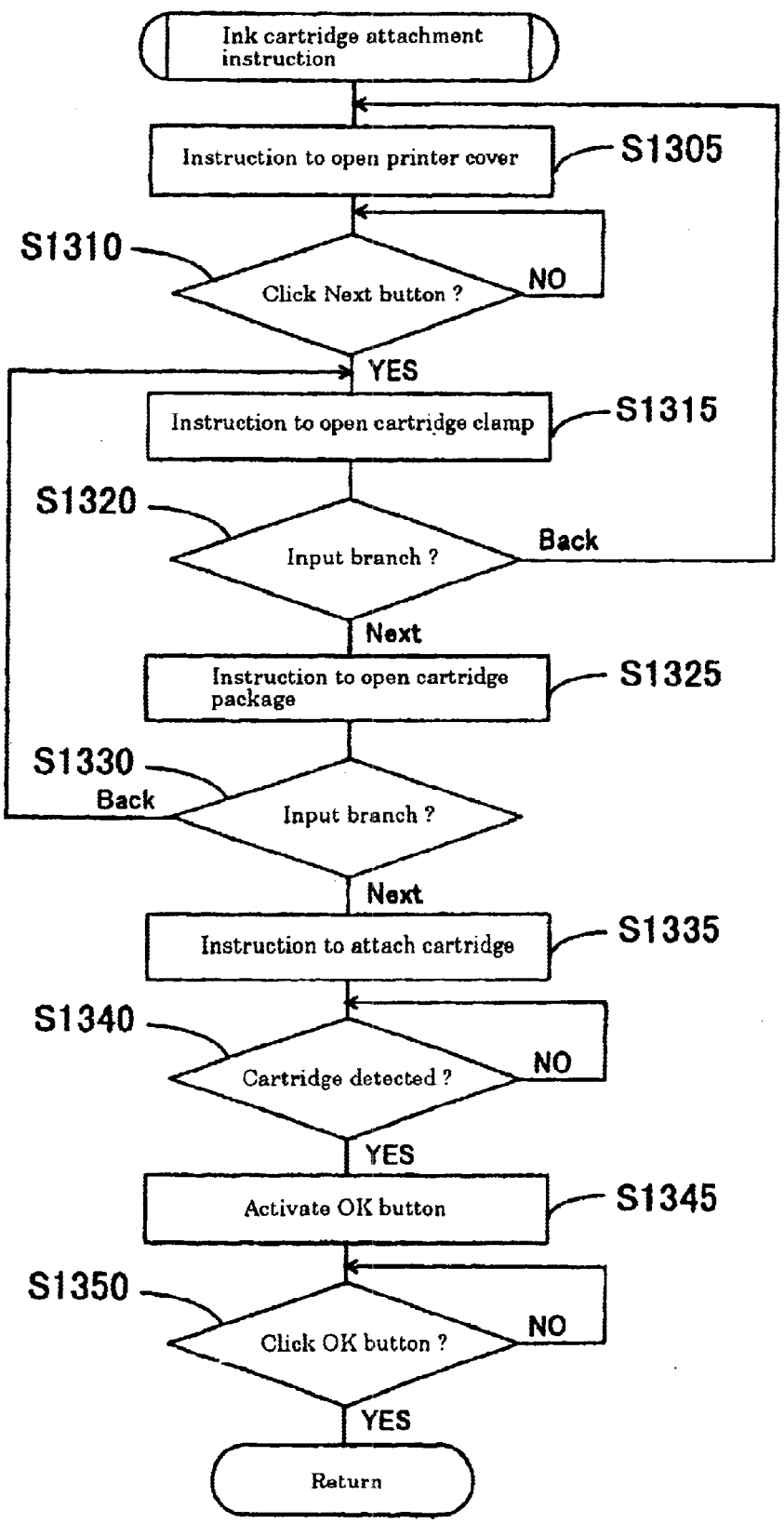
FIG. 16 is a flowchart showing an ink-cartridge attachment routine.
Figure 17:
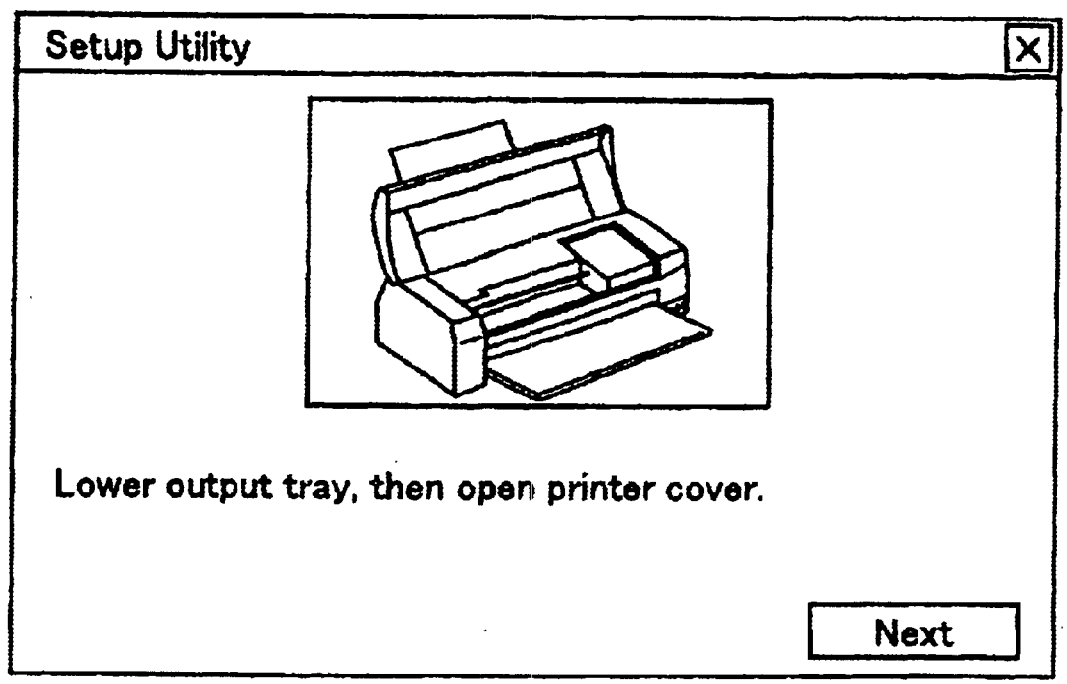
FIG. 17 is a diagram showing an image instructing to open a printer cover.

If the status information from the printer 1050 is detected at step S1220, an ink-cartridge attachment instruction routine is executed at step S1230. That is, as the ink cartridge is not attached to the printer 1050 at this time, the ink cartridge attachment instruction routine is executed to advise the user to attach the ink cartridge to the printer. FIG. 16 is a flowchart showing the ink-cartridge attachment instruction routine. At step S1305, an image as shown in FIG. 17 is displayed to instruct the user to open a printer cover. In the image, as an illustration of the printer where the printer cover is opened and an explanation are displayed, the user can easily open the printer cover by watching the image. When the user has opened the printer cover, the user clicks a "Next" button provided in a lower right position in the image.

Figure 18:
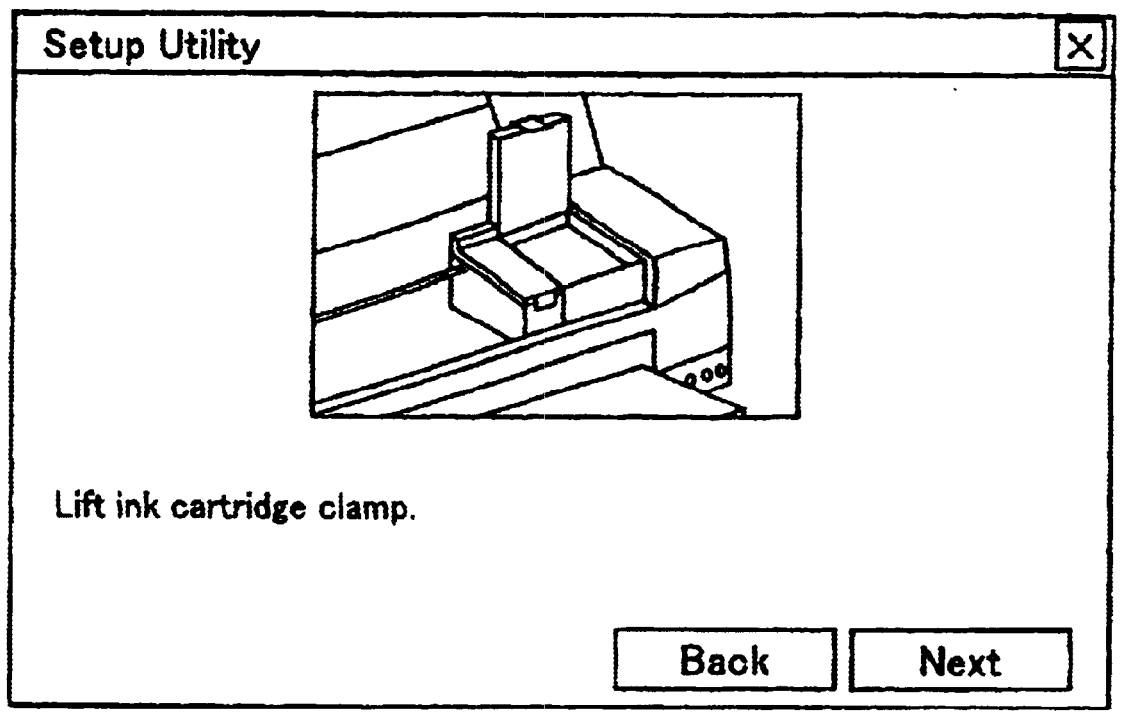
FIG. 18 is a diagram showing an image instructing to open an ink cartridge clamp.

Then, the setup guide program 1075 detects the click operation at step S1310, and displays an image as shown in FIG. 18 at step S1315 to instruct to open an ink cartridge clamp in the printer 1050. The ink cartridge clamp is a cover of a holder to which the ink cartridge is attached. In the image as shown in FIG. 18, a significant-part enlarged view where the ink cartridge clamp is opened and an explanation are displayed. Accordingly, the user opens the ink cartridge clamp in accordance with the displayed content of the image, and clicks the "Next" button in the lower right position in the image. Further, a "Back" button is provided on the left side of the "Next" button. If the "Back" button is clicked, its previous image is displayed.

Figure 19:
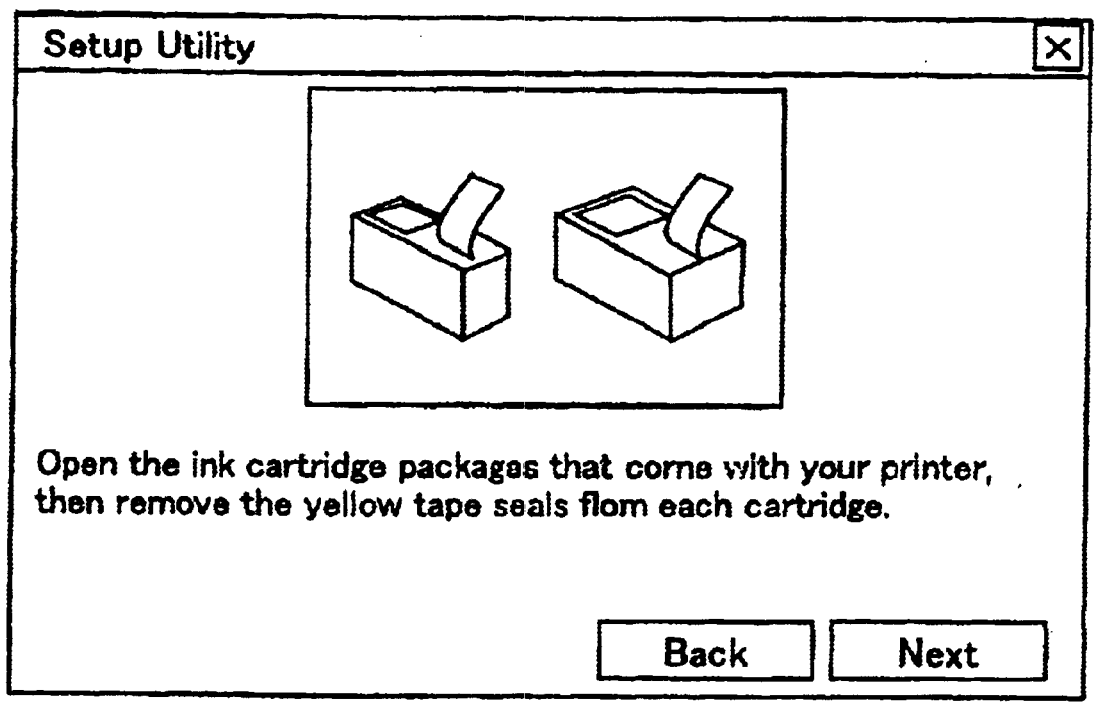
FIG. 19 is a diagram showing an image instructing to open an ink cartridge package.

In the image as shown in FIG. 18, when the "Next" button is clicked, the setup guide program 1075 detects the click operation at step S1320, and displays an image as shown in FIG. 19 at step S1325 to instruct to open the package of the ink cartridge. That is, as the ink cartridge is sealed from ink leakage and packaged, the seal is removed such that the cartridge can be attached to the printer 1050. In the image, as an illustration of the ink cartridge where the seal is removed and an explanation are displayed, the user removes the seal in accordance with the displayed content in the image, then clicks the "Next" button in the lower light position in the image. Similarly, the "Back" button is provided on the left side of the "Next" button, and if the "Back" button is clicked, the previous image can be displayed.

Figure 20:
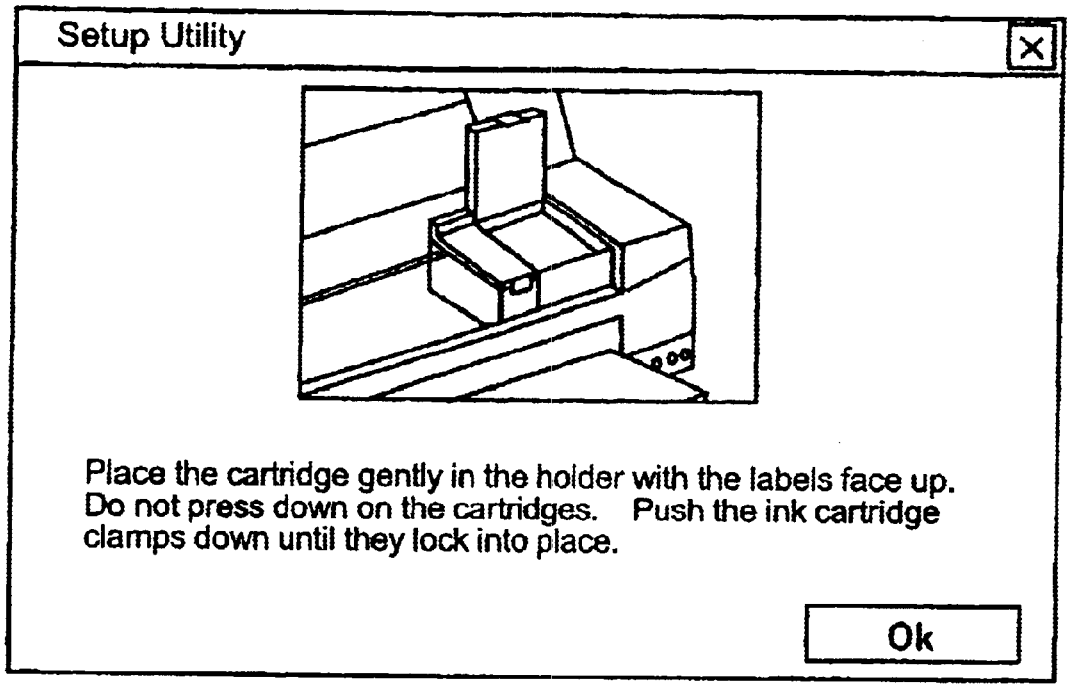
FIG. 20 is a diagram showing an image instructing to attach the ink cartridge.

In the image as shown in FIG. 19, when the "Next" button is clicked, the setup guide program 1075 detects the click operation at step S1330, and displays an image as shown in FIG. 20 at step S1335 to instruct to attach the ink cartridge to the printer. In the image, as a method for attaching the ink cartridge to the printer is displayed by an illustration and an explanation, the user attaches the ink cartridge to the printer in accordance with the displayed content of the image. The setup guide program 1075 that displayed the image as shown in FIG. 20, monitors the status information from the printer 1050 via the printer driver 1073 at step S1340, to determine whether or not the ink cartridge has been attached to the printer. More specifically, it may be determined based on the sensor output from the residual ink sensor 1066 whether or not the ink cartridge has been attached. The program obtains the sensor output from the status information and makes a determination.

Then, if it is determined that the ink cartridge has been attached to the printer, an "OK" button in the lower right position in the image as shown in FIG. 20 is activated for the user's click operation at step S1345. Accordingly, if there is some error in the attachment of the ink cartridge, the "OK" button is not activated, and the user wonders if some error has occurred. Further, it may be arranged such that in consideration of the possibility of the occurrence of error in attachment of the ink cartridge, a predetermined time-out period is set, and when the time-out has occurred, an image to advise the user to check the attachment of the ink cartridge is displayed.

On the other hand, in the image as shown in FIG. 20, when the user clicks the "OK" button, the setup guide program 1075 detects the click operation at step S1350, and terminates the ink-cartridge attachment instruction routine.

Figure 21:
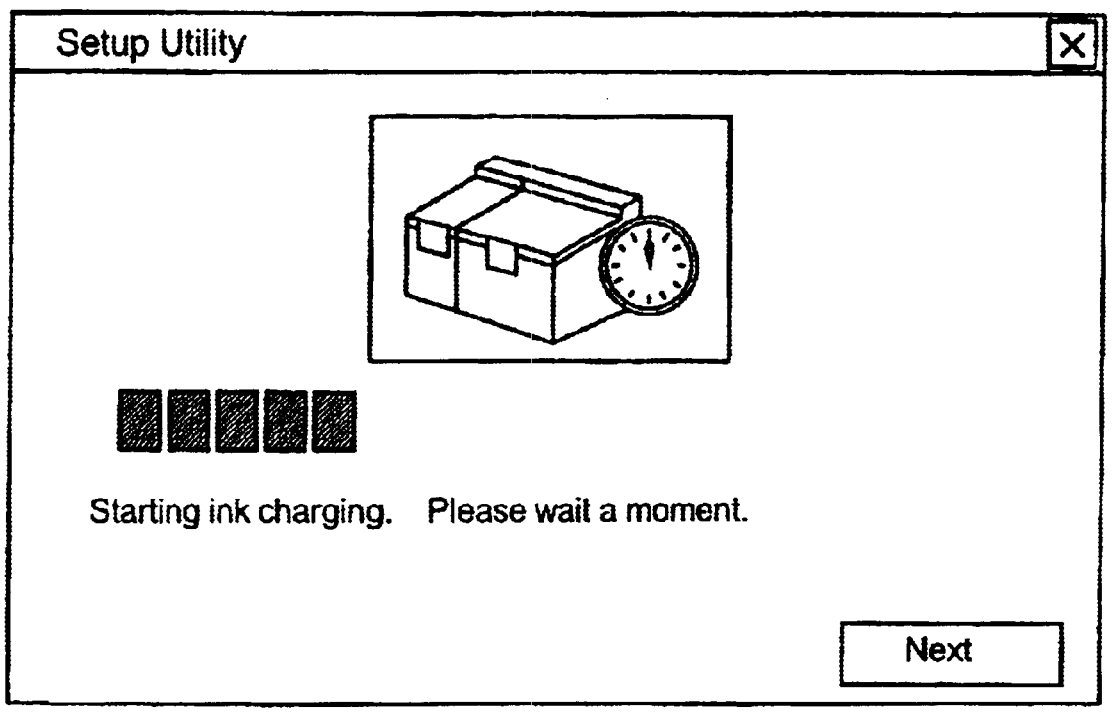
FIG. 21 is a diagram showing an image indicating that ink charging is being performed.

When the printer 1050 detects that the ink cartridge has been attached to the printer, starts ink charging to the nozzles. The setup guide program 1075 that terminated the ink-cartridge attachment instruction routine at step S1230, executes an ink charging display routine at step S1240. In the ink charging display routine, an image as shown in FIG. 21 is displayed to notify the user that ink charging is being performed. In FIG. 21, a status bar is provided in a horizontal direction in about the center of the image, and the status bar gradually extends rightward from the left of the image, in correspondence with the progress of ink charging processing.

The progress of ink charging processing can be detected from the status information obtained via the printer driver 1073. The setup guide program 1075 gradually extends the status bar while detecting the actual progress of ink charging. More specifically, as the time necessary for the ink charging processing is unique to the printer depending on printer type, it may be arranged such that the printer 1050 counts the time elapsed from the start of ink charging and outputs the time as the status information. Note that in the present embodiment, the status bar is displayed to indicate the progress of ink charging, however, the residual time by the completion of ink charging, being counted down, may be displayed.

Figure 22:
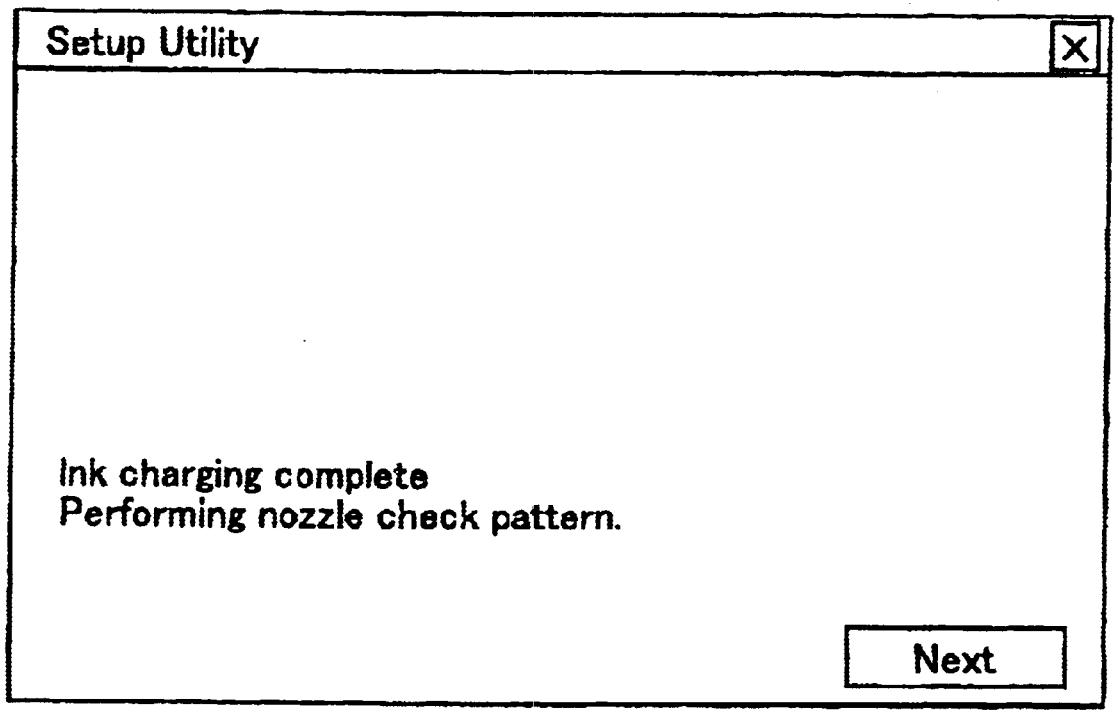
FIG. 22 is a diagram showing an image indicating that the ink charging has been completed.

In the image as shown in FIG. 21, if the user determines from the status bar that the ink charging has been completed, the user clicks the "Next" button in the lower right position in the image. Then, the setup guide program 1075 detects the click operation, and displays an image as shown in FIG. 22, to notify the user that the ink charging has been completed and nozzle check pattern printing processing is to be executed. In the image as shown in FIG. 22, similarly, the "Next" button is provided in the lower right position, and when the "Next" button is clicked, the setup guide program 1075 terminates the ink charging display routine, and at step S1250, executes a nozzle check pattern printing routine.

Figure 23:
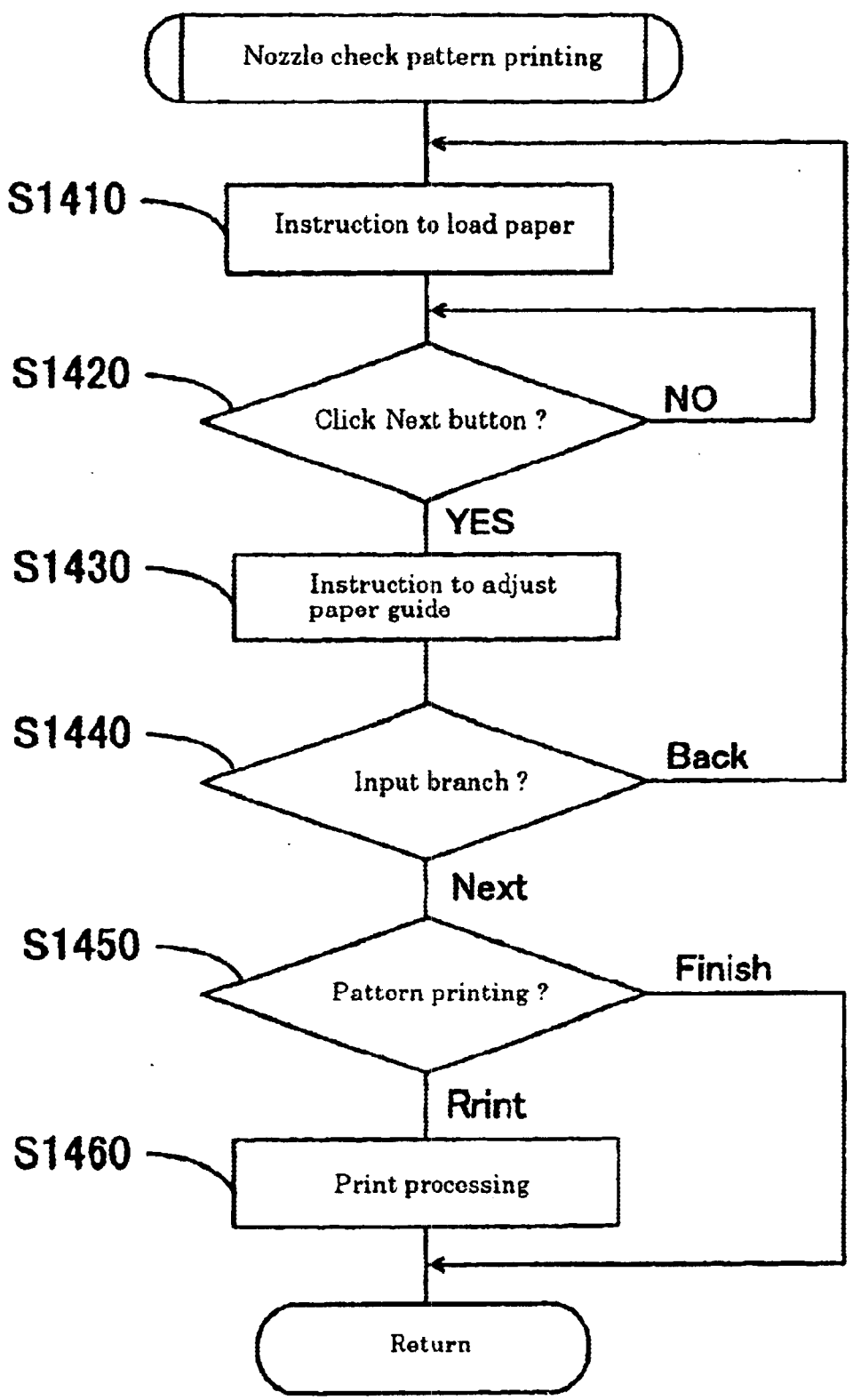
FIG. 23 is a flowchart showing a nozzle check pattern printing routine.
Figure 24:
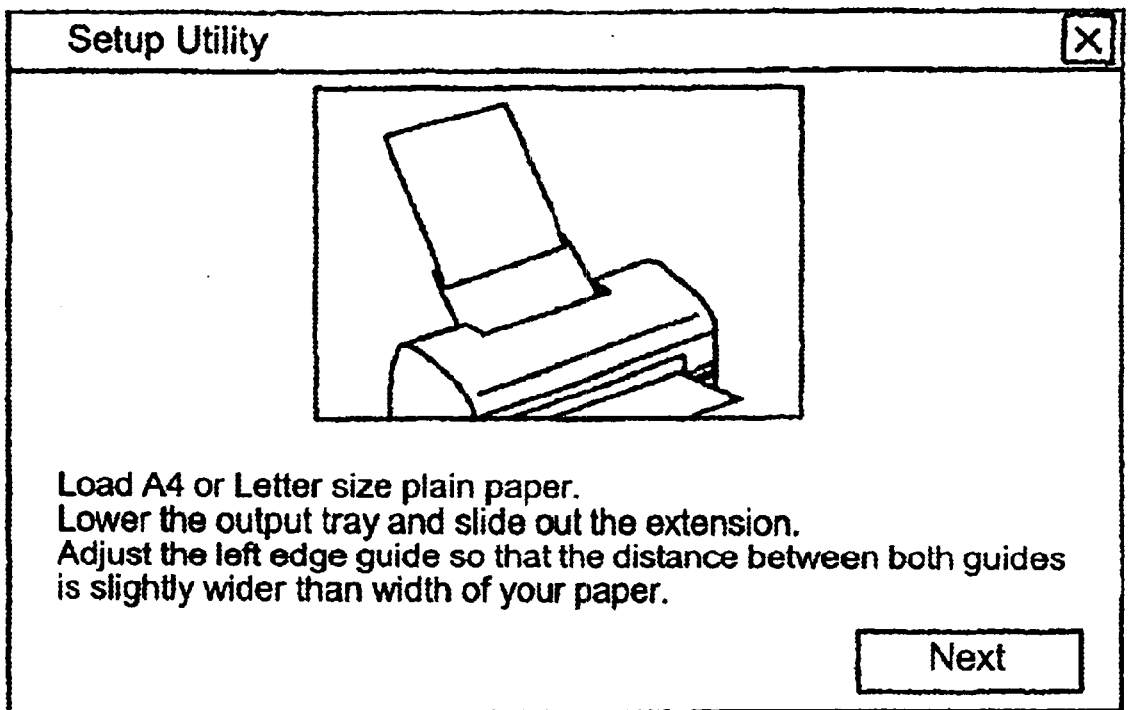
FIG. 24 is a diagram showing an image indicating a method for setting paper for nozzle check.
Figure 25:
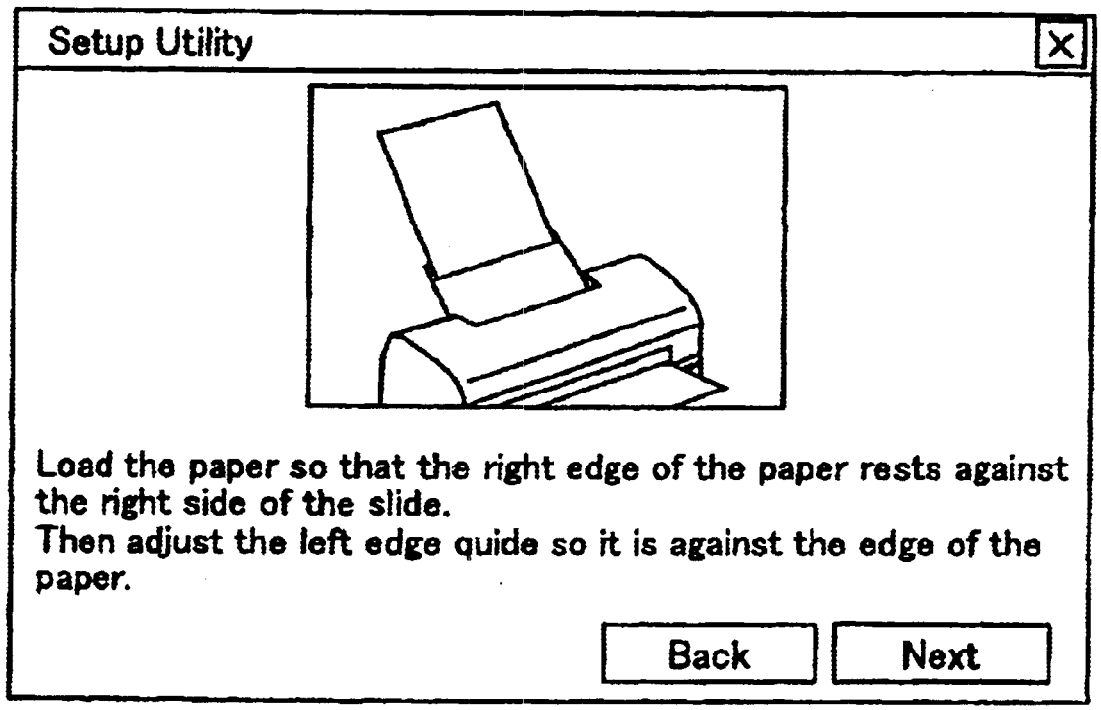
FIG. 25 is a diagram showing an image instructing to adjust paper guides of a paper support.

FIG. 23 is a flowchart showing the nozzle check pattern printing routine. At step S1410, an image as shown in FIG. 24 is displayed to instruct a method for loading print paper for nozzle check with an illustration and an explanation. The user sets print paper on the paper support of the printer 1050 in accordance with the displayed content in the image, and clicks the "Next" button displayed in the lower right position in the image. Then, the setup guide program 1075 detects the click operation at step S1420, and displays an image as shown in FIG. 25 at step S1430, to instruct to adjust paper guides of the paper support, similarly with an illustration and an explanation. More specifically, in the paper support, its support width can be adjusted in correspondence with paper size. The user watches the image and appropriately adjusts the paper guides, the clicks the "Next" button in the lower right position in the image. Similarly, the "Back" button is provided on the left side of the "Next" button. If the "Back" button is clicked, the previous image can be displayed.

Figure 26:
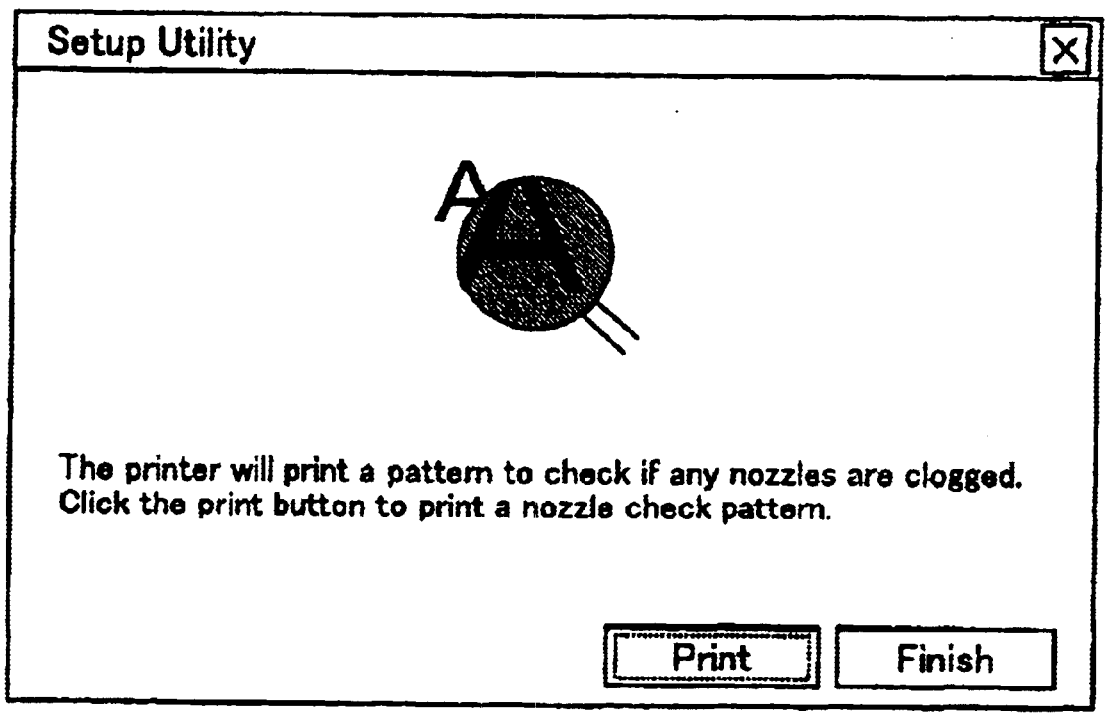
FIG. 26 is a diagram showing an image for inputting an instruction to print or not to print a nozzle check pattern.

In the image as shown in FIG. 25, when the "Next" button is clicked, the setup guide program 1075 detects the click operation at step S1440, and at step S1450, displays an image as shown in FIG. 26 to advise the user to select whether or not a nozzle check pattern is printed and input the result of selection. The nozzle check pattern is a print pattern for determination as to whether or not the nozzles are clogged. If the nozzle check pattern is to be printed, a "Print" button provided in the lower right position in the image is clicked. Then the setup guide program 1075 executes nozzle check pattern print processing at step S1460.

Figure 27:
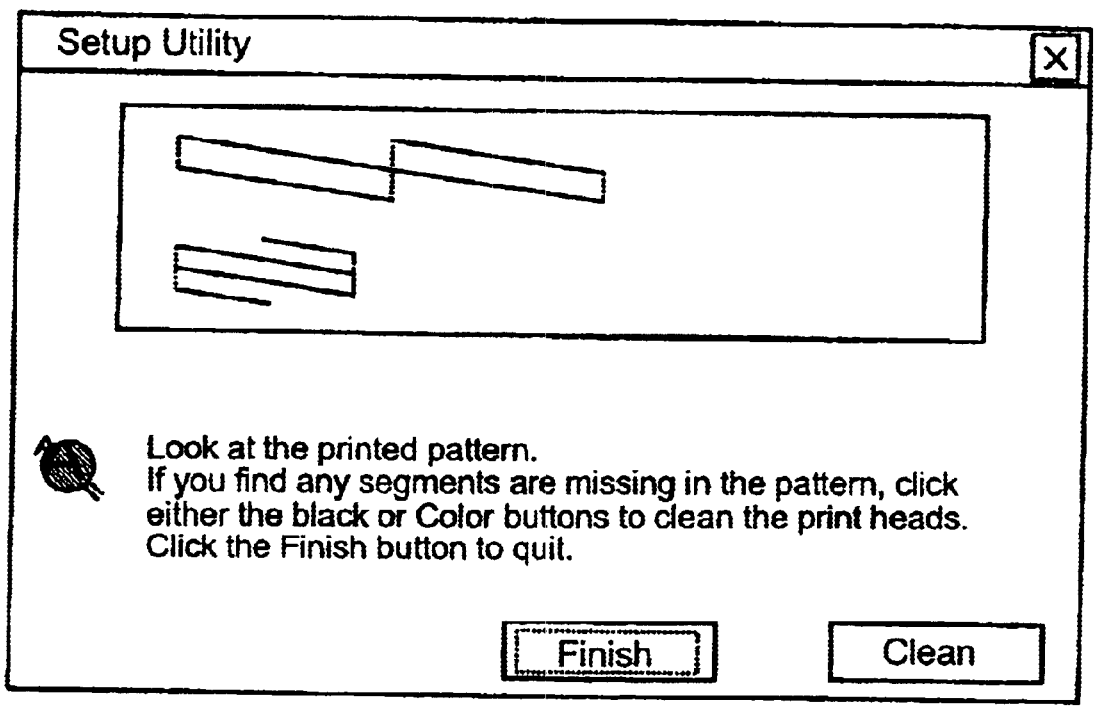
FIG. 27 is a diagram showing an image instructing to check whether nozzles are clogged or not.

That is, the setup guide program 1075 causes the printer driver 1073 to generate predetermined print data and transfer the print data to the printer 1050. Then the printer 1050 maps the print data on the D-RAM 1057 as a buffer, and when the print data has been mapped, performs actual printing. Thus, the nozzle check pattern is printed. When the nozzle check pattern printing routine has been completed, the setup guide program 1075 displays an image as shown in FIG. 27 at step S1260. In this image, an illustration and an explanation are displayed for visually checking whether or not the nozzles are clogged and performing cleaning on the printhead 1061 in accordance with necessity. The user watches the image, and if head cleaning is necessary, clicks a "Clean" button in the lower right position in the image. Further, if head cleaning is not necessary, the user clicks a "Finish" button on the left of the "Clean" button, to terminate the setup operation.

Figure 28:
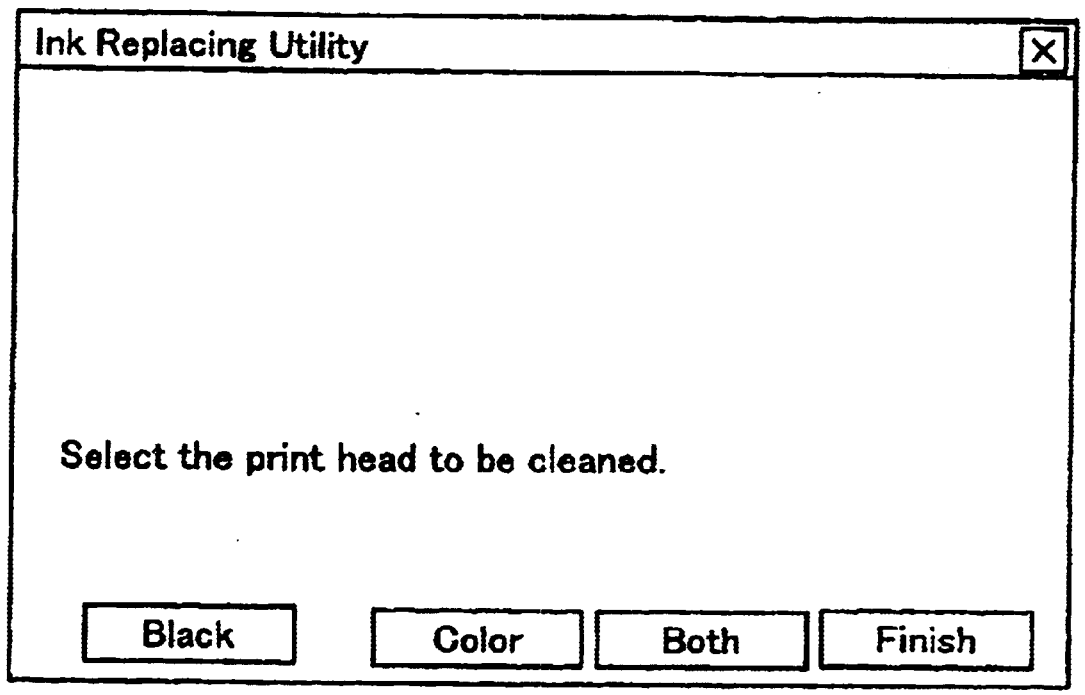
FIG. 28 is a diagram showing an image for selecting the object of head cleaning.

If the user clicks the "Clean" button, the setup guide program 1075 detects the click operation at step S1260, and executes a head cleaning routine at step S1270. In the head cleaning routine, first, an image as shown in FIG. 28 is displayed, to advise the user to select the black ink printhead unit, the color ink printhead unit or both printhead units, and to click one of "Black", "Color" and "Both" buttons in accordance with the user's selection.

Figure 29:
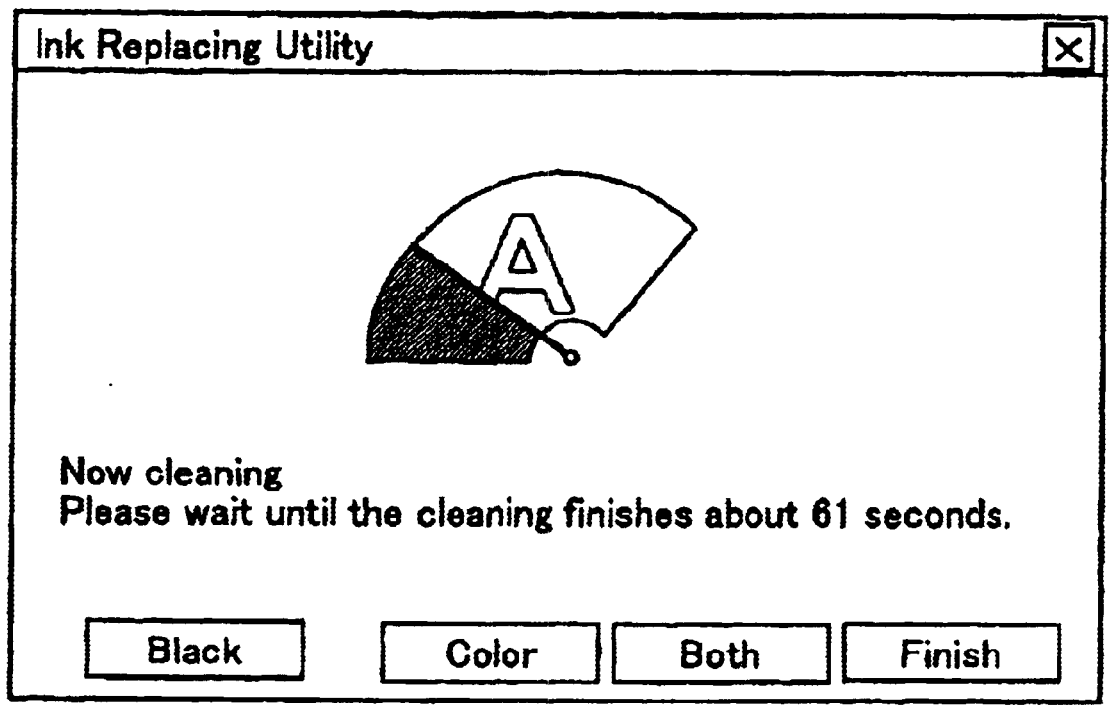
FIG. 29 is a diagram showing an image indicating that head cleaning processing is being performed.

When the user clicks one of these buttons, the setup guide program 1075 transmits the above-described cleaning instruction command to the printer 1050 to cause the printer to perform cleaning on an actual printhead unit of color ink corresponding to the clicked button. The printer 1050 receives the cleaning instruction command, and starts cleaning on the printhead unit of the corresponding color ink. At the same time, the setup guide program 1075 displays an image as shown in FIG. 29, to notify the user that head cleaning is being performed.

Figure 30:
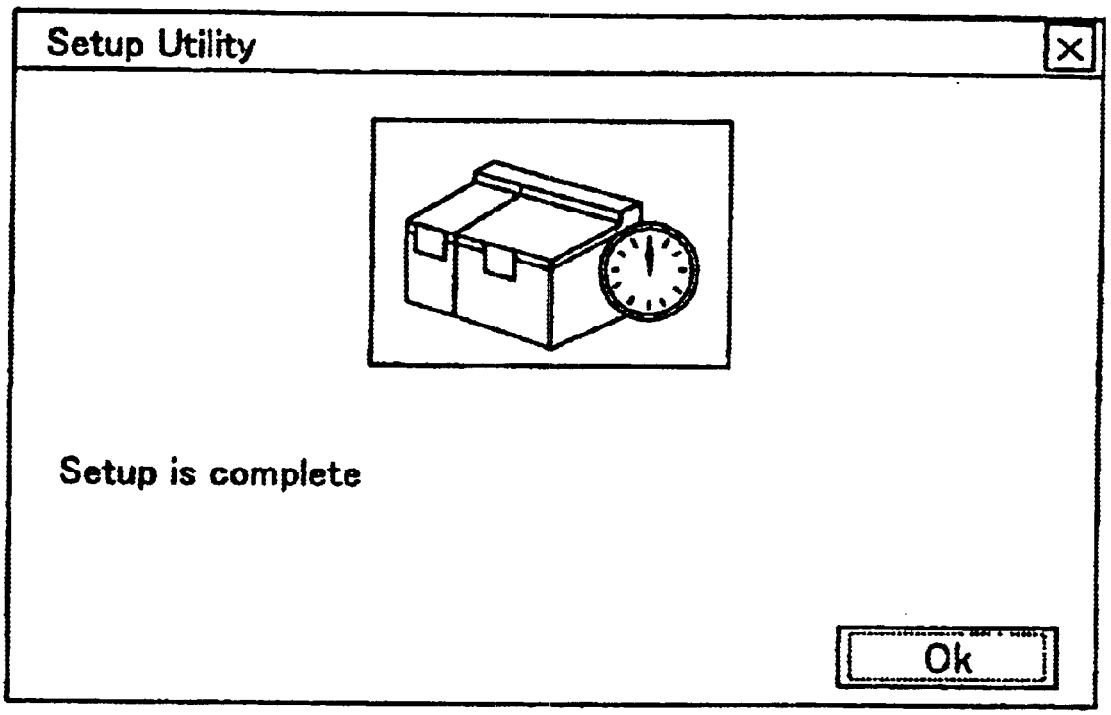
FIG. 30 is a diagram showing an image indicating that setup has been completed.

In this image, a moving picture showing a window being cleaned with a wiper is displayed, with residual time by the completion of head cleaning. The time necessary for the head cleaning differs based on the type of printhead unit, i.e., whether the cleaning is performed on the black ink printhead unit, the color ink printhead unit or both black and color ink printhead units. However, the time can be empirically obtained in advance, and the pre-obtained time is displayed in correspondence with the actually clicked button. Further, the printer 1050 outputs information indicating that the head cleaning is being performed, as the status information. The setup guide program 1075 side monitors the status information via the printer driver 1073, and when it detects that the head cleaning has been completed, displays an image as shown in FIG. 30, to notify the user of the completion of the setup operation.

As described above, in the present embodiment, the user performs a setup operation while watching an image displayed by the setup guide program 1075, and in accordance with the progress of the setup operation, an image relating to the next setup operation is displayed. Accordingly, it is not necessary for the user to pay attention to the status of the printer 1050, e.g., whether or not an ink cartridge has been correctly attached, or whether or not ink charging has been completed. The user may simply perform the setup operations in accordance with the sequentially displayed images. In the present embodiment, the information displayed in the respective images correspond to the guidance information, and the setup CD-ROM in which the setup guide program 1075 to display the guidance information corresponds to the medium containing the computer peripheral device maintenance guide program according to the present invention. Note that in the present embodiment, the setup guide program 1075 is executed by utilizing the setup CD-ROM, however, a medium for execution of the setup guide program is not limited to a medium having a material substance such as the CD-ROM. For example, the setup guide program may be downloaded via a public communication line by utilizing the modem 1027 and executed.

Next, the operation of the present embodiment having the above construction will be described.

To install the printer 1050 into the computer system, the paper support is assembled, and AC cable and interface cable are connected by referring to a book-style manual came with the printer. Thereafter, the power of the computer 1010 is turned on, and the setup CD-ROM similarly packed with the printer 1050 is attached to a CD-ROM drive 1019*b* of the computer 1010. Then, the operating system 1043 reads the automatic startup control information 1071 recorded in the setup CD-ROM, and in accordance with the content of the information, first, the install program 1072 is started. The install program 1072 installs the programs such as the printer driver 1073 and the utility 1074 recorded in the setup CD-ROM into the computer 1010, and the program ends (step S110).

Thereafter, the setup guide program 1075 is executed by the computer 1010 (step S120). The setup guide program 1075 displays an image instructing to turn the power of the printer 1050 on (step S1210), and waits until the status information is obtained from the printer 1050 via the printer driver 1073 (step S1220). When the user turns the power of the printer 1050 on, the printer 1050 outputs the status information, so that the setup guide program 1075 can detect the status information, and executes the ink cartridge attachment [instruction] routine (step S1230).

In the ink cartridge attachment instruction routine, as the respective images as shown in FIGS. 17 to 20 are sequentially displayed, the user attaches the ink cartridge to the printer 1050, in accordance with the displayed contents of the respective images. Then, the printer 1050 detects that the ink cartridge has been attached, and outputs the result of detection as the status information. On the other hand, the setup guide program 1075 on the computer 1010 side obtains the status information, and in the image as shown in FIG. 20, activates the "OK" button provided in the lower right position in the image. Then the user clicks the "OK" button. The setup guide program 1075 detects the click operation and terminates the ink cartridge attachment instruction routine (steps S1305 to S1350).

The setup guide program 1075, that terminated the ink cartridge attachment instruction routine, next executes the ink charging display routine (step S1240). In the ink charging display routine, the image as shown in FIG. 21 is displayed to notify the user that the ink charging is being performed. In FIG. 21, a status bar is provided in a lateral direction at about the center of the image, and the status bar gradually extends rightward from the left of the image in correspondence with the progress of ink charging processing. The progress of ink charging processing can be detected from the status information. The setup guide program 1075 gradually extends the status bar while detecting the actual progress. In this image, when the ink charging is completed, the user clicks the "Next" button in the lower right position in the image. Then, the image as shown in FIG. 22 is displayed, and the user watches the image and clicks the "Next" button in the lower right position in the image, to terminate the ink charging display routine.

Thereafter, the setup guide program 1075 executes the nozzle check pattern printing routine (step S1250). In the nozzle check pattern printing routine, as the respective images as shown in FIGS. 24 to 26 are sequentially displayed, the user sets paper for nozzle check pattern printing on the paper support and instructs to start the nozzle check pattern printing, in accordance with the displayed contents of the respective images. Then, the setup guide program 1075 causes the printer driver 1073 to generate predetermined print data and transfer the print data to the printer 1050. The printer 1050 receives the print data, maps the print data on the buffer, and when the print data has been mapped, performs actual printing to print-output the nozzle check pattern (steps S1410 to S1460).

In this manner, when the nozzle check pattern printing routine has been completed, the setup guide program 1075 displays the image as shown in FIG. 27 such that the user determines by visual check whether or not the nozzle check pattern is correctly printed. If the nozzle check pattern is not correctly printed, the user is advised to perform head cleaning (step S1260). If head cleaning is necessary, the user clicks the "Clean" button in the lower right position in the image. Then, the setup guide program 1075 executes the head cleaning routine (step S1270).

In the head cleaning routine, first, the image as shown in FIG. 28 is displayed to advise the user to select a printhead unit as the object of head cleaning from the black ink printhead unit, the color ink printhead unit or both printhead units, and to click one of the "Black", "Color" and "Both" buttons in accordance with the result of user's selection. When the user clicks any one of these buttons, the setup guide program 1075 transmits the cleaning instruction command to the printer 1050 to cause the printer to perform cleaning on a printhead unit of color ink corresponding to the actually clicked button. Then, the printer 1050 receives the cleaning instruction command, and starts cleaning on the printhead unit of the corresponding color ink. At this time, the setup guide program 1075 displays the image as shown in FIG. 29 to notify the user that the head cleaning processing is being performed.

In this image, a moving picture showing a window being cleaned with a wiper is displayed, and the residual time by the completion of the head cleaning is displayed. On the other hand, the printer 1050 outputs the status where the head cleaning processing is being performed as the status information. The setup guide program 1075 side monitors the status information via the printer driver 1073, and when the completion of head cleaning processing is detected, the program displays the image as shown in FIG. 30 to notify the user of the completion of the setup operation (step S1280).

Note that in the present embodiment, the present invention is applied to the setup operation of the printer 1050 to assist the user to smoothly perform the setup operation, however, the present invention is not limited to the setup operation. For example, the present invention may be applied to an ink cartridge exchange operation upon occurrence of ink shortage in normal printing. In this case, similarly, the present invention assist the user to smoothly perform the exchange operation. Further, the present invention may be applied to an error removal operation upon occurrence of error such as paper jam. In this manner, various applications can be considered.

As described above, in the setup operation of the printer 1050, the status of the printer 1050 such as existence/absence of ink cartridge or ink charging is detected on the computer 1010 side via the printer driver 1073, while the setup guide program 1075 determines the progress of setup operation based on the status change of the printer 1050 and sequentially displays images showing operation procedures in correspondence with the progress. Accordingly, as it is unnecessary for the user to perform the setup operation while determining the status of the printer 1050, the user can smoothly perform the setup operation.

INDUSTRIAL APPLICABILITY

As described above, according to the present invention, to display guidance information relating to computer peripheral device maintenance operation, the progress of maintenance operation is determined based on the status change of the computer peripheral device, and the guidance information is displayed in correspondence with the progress. Accordingly, if the maintenance operation is performed while determining the status of the computer peripheral device, the present invention provides a medium containing a computer peripheral device maintenance guide program to display user-friendly guidance information, to assist the user to smoothly perform the maintenance operation.

Further, in the present invention according to claim 2, as guide information relating to maintenance operation is displayed as a moving picture, the user can easily understand the operation.

Further, in the present invention according to claim 3, as the progress of maintenance operation is displayed, the user can easily grasp the progress without feeling insecure about the operation.

Further, in the present invention according to claim 4, as guidance information related to the operation check on the computer peripheral device is displayed, the inconvenience that the computer peripheral device does not operate in actual use can be reduced.

Further, in the present invention according to claim 5, as a result of operation check on the computer peripheral device, if an error has been found in the operation of the device, the error can be removed.

Further, in the present invention according to claims 6 and 7 similarly, in a case where maintenance operation is performed while the status of the computer peripheral device is determined, the present invention provides a computer peripheral device maintenance guide device and a computer peripheral device maintenance guide method to display user-friendly guidance information to assist the user to smoothly perform the maintenance operation.

What is claimed is:

1. A computer program product, having a computer readable medium with a printer installation operation guide program, for enabling a computer of a computer system to perform predetermined steps, the computer system further including a printer to be installed, the printer diagnosing its status at predetermined intervals, and, in response to detecting a change in the status, generating printer status information and transmitting the printer status information to the computer, the predetermined steps comprising:

a. entering a printer status and also displaying predetermined guidance information on the computer, relating to an operation for installing a printer; and then
   b. automatically detecting, on the computer, the printer status by monitoring the printer status information obtained from the printer; and then
   c. in response to the detected printer status, automatically displaying subsequent guidance information on the computer system;

wherein the subsequent guidance information corresponds to the progress of the printer installation operation, and is based on the results of detecting the printer status.

2. The computer program product as set forth in claim 1, wherein said predetermined guidance information comprises a moving picture.

3. The computer program product as set forth in claim 1, wherein said predetermined guidance information relates to the progress of said operation for installing said printer.

4. The computer program product as set forth in claim 1, wherein said predetermined guidance information relates to an operation check procedure of said printer.

5. The computer program product as set forth in claim 4, wherein said subsequent guidance information relates to an operation to remove an error indicated after said operation check procedure.

* * * * *

UNITED STATES PATENT AND TRADEMARK OFFICE
CERTIFICATE OF CORRECTION

PATENT NO. : 6,721,879 B1  Page 1 of 1
DATED : April 13, 2004
INVENTOR(S) : Shinji Tanaka It is certified that error appears in the above-identified patent and that said Letters Patent is hereby corrected as shown below:

Title page,
Item [54], Title, should read -- MEDIUM CONTAINING PRINTER MAINTENANCE GUIDE PROGRAM FOR AUTOMATIC DISPLAY ON A COMPUTER IN RESPONSE TO DETECTING A CHANGE IN THE PRINTER STATUS --

Title page,
Item [86], PCT No., should read

-- [86] PCT No.: PCT/JP99/01990
§ 371 (c)(1),
(2), (4) Date: December 2, 1999 --

Signed and Sealed this

Twenty-first Day of December, 2004

JON W. DUDAS
*Director of the United States Patent and Trademark Office*